US011442280B2

(12) United States Patent
McCracken et al.

(10) Patent No.: US 11,442,280 B2
(45) Date of Patent: Sep. 13, 2022

(54) ADJUSTABLE HEAD-MOUNTED DISPLAY TO ACCOMMODATE DIFFERENT HEAD AND FACE SIZES

(71) Applicant: Valve Corporation, Bellevue, WA (US)

(72) Inventors: Ivan A. McCracken, Bellevue, WA (US); Carl Samuel Conlee, IV, Seattle, WA (US); Isaac Frazier, Portland, OR (US); Keaton Snyder, Donald, OR (US); John A. Underwood, Portland, OR (US)

(73) Assignee: Valve Corporation, Bellevue, WA (US)

( * ) Notice: Subject to any disclaimer, the term of this patent is extended or adjusted under 35 U.S.C. 154(b) by 204 days.

(21) Appl. No.: 16/850,426

(22) Filed: Apr. 16, 2020

(65) Prior Publication Data

US 2020/0341283 A1    Oct. 29, 2020

Related U.S. Application Data

(60) Provisional application No. 62/837,662, filed on Apr. 23, 2019.

(51) Int. Cl.
*G02B 27/01* (2006.01)
(52) U.S. Cl.
CPC ..... *G02B 27/0176* (2013.01); *G02B 27/0172* (2013.01); *G02B 2027/0123* (2013.01);
(Continued)
(58) Field of Classification Search
CPC ............ G02B 27/0176; G02B 27/0172; G02B 2027/0123; G02B 2027/0156; G02B 2027/0159
See application file for complete search history.

(56) References Cited

U.S. PATENT DOCUMENTS 3,597,041 A    8/1971  Frantz et al.
5,734,499 A    3/1998  Matsumoto et al.
(Continued)

OTHER PUBLICATIONS

The PCT Search Report and Written Opinion dated Jul. 23, 2020 for PCT Application No. PCT/US20/29397, 14 pages.
(Continued)

*Primary Examiner* — Kwang-Su Yang
(74) *Attorney, Agent, or Firm* — Lee & Hayes, P.C.

(57) ABSTRACT

A head-mounted display (HMD) includes various features that allow for customizing the HMD to different users. The HMD may include an interpupillary distance (IPD) adjustment mechanism that includes a double biasing assembly for smooth, controlled adjustment of the spacing between lens tubes. The HMD may include a field of view (FOV) adjustment mechanism that includes first and second gear assemblies connected via a connecting rod to allow uniform adjustment of the spacing between the lenses and the user's face. The HMD may further include a swappable face gasket, a swappable visor, a removable head strap, and a modular accessory compartment for further customizations to the HMD. The HMD may further include inconspicuous spectrum-transmissive windows that are made with a spectrum-transmissive base material for the HMD housing that is coated with a spectrum-opaque material, and the spectrum-opaque material is selectively removed to create the spectrum-transmissive windows.

20 Claims, 13 Drawing Sheets

(52) U.S. Cl.
CPC ............... *G02B 2027/0156* (2013.01); *G02B 2027/0159* (2013.01); *G02B 2027/0161* (2013.01)

(56) References Cited

U.S. PATENT DOCUMENTS

| | | |
|---|---|---|
| 5,880,773 A | 3/1999 | Suzuki |
| 5,949,575 A | 9/1999 | Matsumoto |
| 7,786,954 B2 | 8/2010 | Mizuuchi et al. |
| 2008/0198470 A1* | 8/2008 | Hamilton ............... G02B 23/18 359/600 |
| 2008/0239523 A1* | 10/2008 | Beck .................. G02B 27/0176 359/823 |
| 2017/0237977 A1 | 8/2017 | Patel |
| 2018/0338130 A1 | 11/2018 | Miller et al. |

OTHER PUBLICATIONS

The International Preliminary Report on Patentability for PCT Application No. PCT/US20/29397, dated Nov. 4, 2021.

\* cited by examiner

ADJUSTABLE HEAD-MOUNTED DISPLAY TO ACCOMMODATE DIFFERENT HEAD AND FACE SIZES

CROSS REFERENCE TO RELATED APPLICATION

This application claims priority to commonly assigned, U.S. Provisional Patent Application Ser. No. 62/837,662, filed Apr. 23, 2019. Application Ser. No. 62/837,662 is fully incorporated herein by reference.

BACKGROUND

Head-mounted displays are used in various fields, including engineering, medical, military, and video gaming. In some instances, head-mounted displays may present information or images to a user as part of a virtual reality or augmented reality environment. As an example, while playing a video game, a user may wear a head-mounted display to immerse the user within a virtual environment.

Conventional head-mounted displays provide inadequate or no adjustment to accommodate differing head sizes, face shapes, and eye spacings. As a result, some users may find it difficult to enjoyably wear head-mounted displays. For instance, if the lens tubes are horizontally misaligned with the user's eyes, a scene presented on the head-mounted display may only be partially visible to the user. If the display panels are too close or too far from the use's eyes, the user's field of view (FOV) may not be optimized. Conventional head-mounted displays may therefore be unable to accommodate different users. Head-mounted displays that are adjustable tend to be difficult and/or inconvenient to adjust by virtue of crude adjustment mechanisms, and they do not provide an optimized level of comfort, leaving the user frustrated.

BRIEF DESCRIPTION OF THE DRAWINGS

The detailed description is described with reference to the accompanying figures. In the figures, the left-most digit(s) of a reference number identifies the figure in which the reference number first appears. The same, or like, reference numbers in different figures indicate similar or identical items.

DETAILED DESCRIPTION

Figure 1:
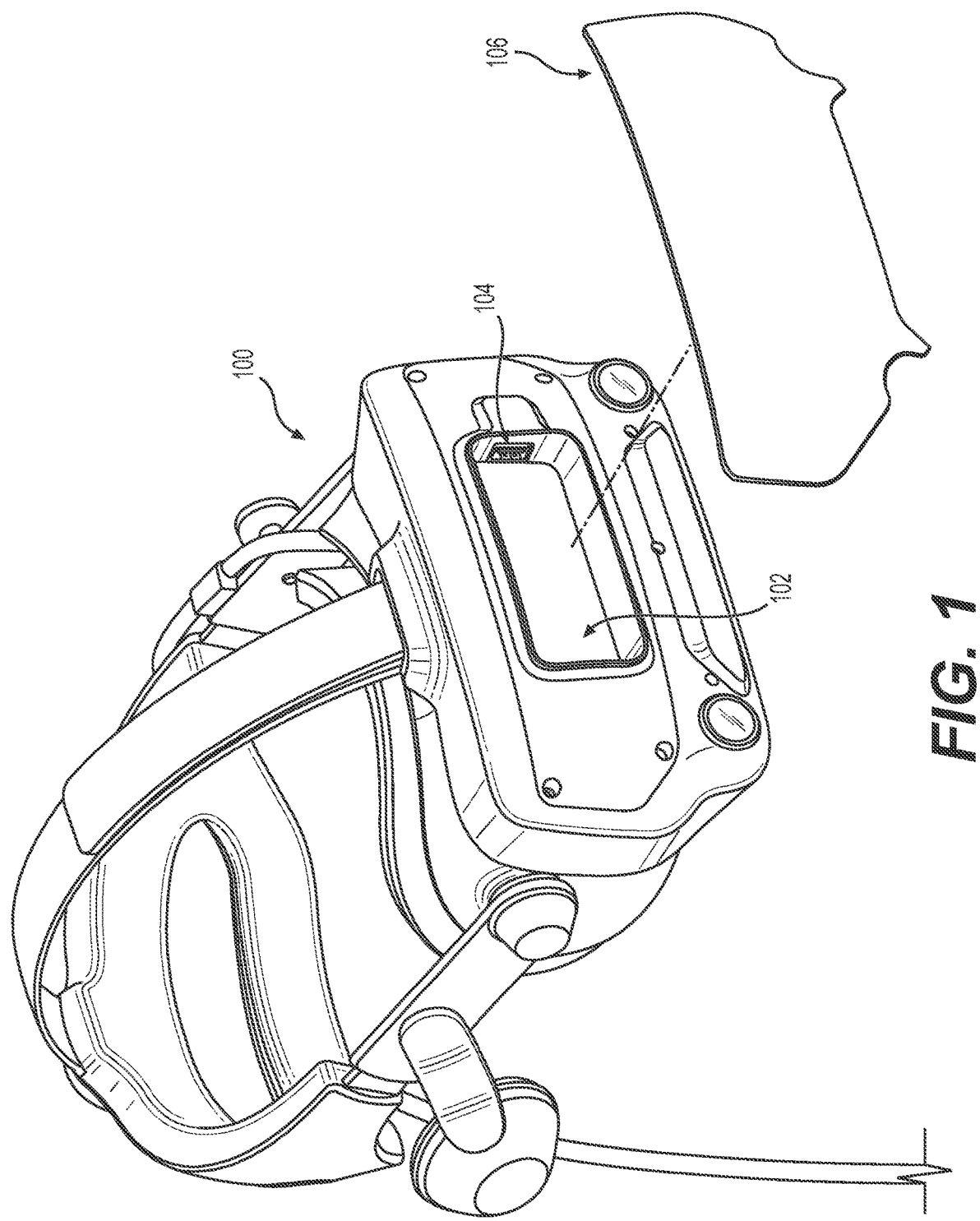
FIG. 1 illustrates a front perspective view of an example head-mounted display (HMD) with a visor shown exploded from the HMD to reveal a modular accessory compartment, according to an embodiment of the present disclosure.

As mentioned above, head-mounted displays (HMDs) have a wide range of applications and, in some instances, may need to accommodate for varying head sizes, face shapes, and eye spacings among different users. Conventional HMDs, however, offer little to no adjustment to adapt to different users. For instance, in conventional HMDs, the distance between the lens tubes may be fixed, or, if adjustable, the adjustment mechanism may be difficult or inconvenient to operate, especially while wearing the HMD. In conventional HMDs, the distance between the user's face and the display panels (or lenses) may also be fixed, or, if adjustable, the adjustment mechanism may be difficult or clunky to operate, especially while wearing the HMD.

Described herein are, among other things, techniques and systems, including a HMD, for adjusting the spacing between a pair of lens tubes of the HMD to accommodate users of varying interpupillary distances (IPDs). For example, a HMD may comprise a rod coupled to a midframe of the HMD, a pair of lens tubes coupled to the rod (e.g., via a pair of movable frames that are coupled to the pair of lens tubes), each lens tube/movable frame being movable bidirectionally along the rod (e.g., in a first direction toward a left side of the HMD or in a second direction toward a right side of the HMD). The HMD may also include an actuator accessible from outside of a housing of the HMD, as well as a movable elongate member coupled to the actuator and to the midframe. A first biasing member coupled to the movable elongate member and to the midframe is configured to resist movement of the movable elongate member in a direction of travel of the elongate member. A rotatable gear coupled to the midframe and disposed between the pair of lens tubes/movable frames is engaged with the movable elongate member, and a pair of second biasing members coupled to the rod are configured to physically bias the pair of lens tubes/movable frames towards the rotatable gear (e.g., by physically biasing the pair of movable frames against a pair of spiral projections extending from a face of the rotatable gear).

Also described herein are, among other things, techniques and systems, including a HMD, for adjusting the spacing between the user's face and the lenses of the HMD to adjust the field of view (FOV) and/or the eye relief to accommodate different users. For example, a HMD may comprise a pair of lens assemblies coupled to a first portion of the HMD. An actuator disposed on a first side of the HMD may be accessible from outside of a housing of the HMD, and a pair of gear assemblies disposed on opposite sides of the HMD may be connected by a connecting rod and coupled to a second portion of the HMD that is movable relative to the first portion of the HMD. One of the gear assemblies of the pair of gear assemblies is disposed on the first side and coupled to the actuator such that actuation of the actuator causes the pair of gear assemblies to move the second portion of the HMD relative to the first portion of the HMD.

Also described herein are, among other things, an electronic device (e.g., a HMD) having a housing made of a spectrum-transmissive material configured to allow electromagnetic radiation of a specific spectrum to pass therethrough. An outer surface of the housing may be coated with a spectrum-opaque material that is configured to block the electromagnetic radiation of the specific spectrum, and one or more locations on the outer surface are devoid of the spectrum-opaque material to provide one or more spectrum-transmissive windows on the housing. One or more spectrum-specific components (e.g., sensors, beacons, etc.) can be disposed inside the housing behind the one or more spectrum-transmissive windows.

A process for manufacturing an electronic device (e.g., a HMD) having at least one window that allows electromagnetic radiation in a specific spectrum to pass through the at least one window may include forming a housing for the electronic device out of a first material that is configured to allow the electromagnetic radiation in the specific spectrum to pass therethrough, painting an outer surface of the housing with a second material that is configured to block the electromagnetic radiation in the specific spectrum, and removing the second material from at least one location on the outer surface to create the at least one window. In some embodiments, the specific spectrum is the IR spectrum.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims FIG. 1 illustrates a front perspective view of an example head-mounted display (HMD) 100 (sometimes referred to herein as a "wearable display," a "VR headset," an "AR headset," or a "headset") with a visor 106 shown exploded from the HMD 100 to reveal a modular accessory compartment 102. The HMD 100 may include a front portion (or main unit) that is positioned in front or over the eyes of the user to render images output by an application (e.g., a video game). In some instances, the application may execute on a computing device (e.g., a personal computer (PC), game console, etc.) associated with and/or communicatively coupled to the HMD 100. In some instances, the HMD 100 may not rely on an external computing device and may execute an application and render corresponding images using on-board components (e.g., logic, hardware, memory, processors (e.g., central processing units (CPUs), graphics processing units (GPUs), etc.), batteries, and so forth). The HMD 100 may be configured to output a series of images (frames) viewed by the user through optics within the HMD 100, making the user perceive the images as if immersed in a virtual reality (VR) or augmented reality (AR) environment.

The HMD 100 may include a visor 106 that is swappable, or interchangeable, with other types of visors. The visor 106 may be of a customized shape, a customized material, and/or the visor 106 may include customized artwork (e.g., colorings, stickers, markings, holes, surface features, etc.). A user can interchange the visor 106 with a different visor to change the look or appearance of the HMD 100 on the front of the HMD 100. A different user that uses the HMD 100 may have his/her own customized visor 106 such that, and this user may remove an existing visor 106 and replace the existing visor 106 with his/her own, customized visor. The visor 106 may be removably attached to a front of the HMD 100 in any suitable manner, such as by a magnetic coupling mechanism (s) (e.g., magnets on the front of the HMD 100 that couple to corresponding magnets on the visor 106), a hook-and-loop fastener (e.g., Velcro®), pins, screws, hooks, a snap/press fit mechanism, adhesive, or any suitable type of fastener.

The visor 106, when attached to the HMD 100, may cover a compartment 102 (sometimes referred to herein as a "modular accessor compartment 102"). The compartment 102 may be any suitable shape. FIG. 1 depicts a rectangular compartment 102 that is recessed a distance into the front of the HMD 100. The compartment 102 may include a port 104, such as a universal serial bus (USB) port 104, that is electrically connected to components of a printed circuit board (PCB) within the housing of the HMD 100. The port 104 may allow a user to connect modular accessories to the HMD 100 to provide further customization to users of the HMD 100. For example, a light(s) (e.g., light emitting diodes (LEDs)) may be connected to the port 104 so that power can be supplied to the lights to turn on the lights. These lights could be disposed in the compartment 102 behind visor 106, which may be made of optically transparent material (e.g., clear or tinted plastic) to provide a customized lighting effect to the HMD 100. The visor 106 may be any suitable color, and when the visor 106 covers lights within the compartment 106 that are connected via the port 104, the visor 106 may illuminate to provide a customized visual appearance. In some embodiments, a display (e.g., a liquid crystal display (LCD)) can be connected to the port 104 and disposed within the compartment 102 to render images on the display while the HMD 100 is worn by a user. In other scenarios, an auxiliary camera(s) can be connected to the port 104 and disposed in the compartment 102. In some embodiments, auxiliary and/or backup compute resources (e.g., processing, storage, power, etc.) can be connected via the port 104 to enhance the processing power, the storage capacity, and/or the battery life of the HMD 100.

Figure 2:
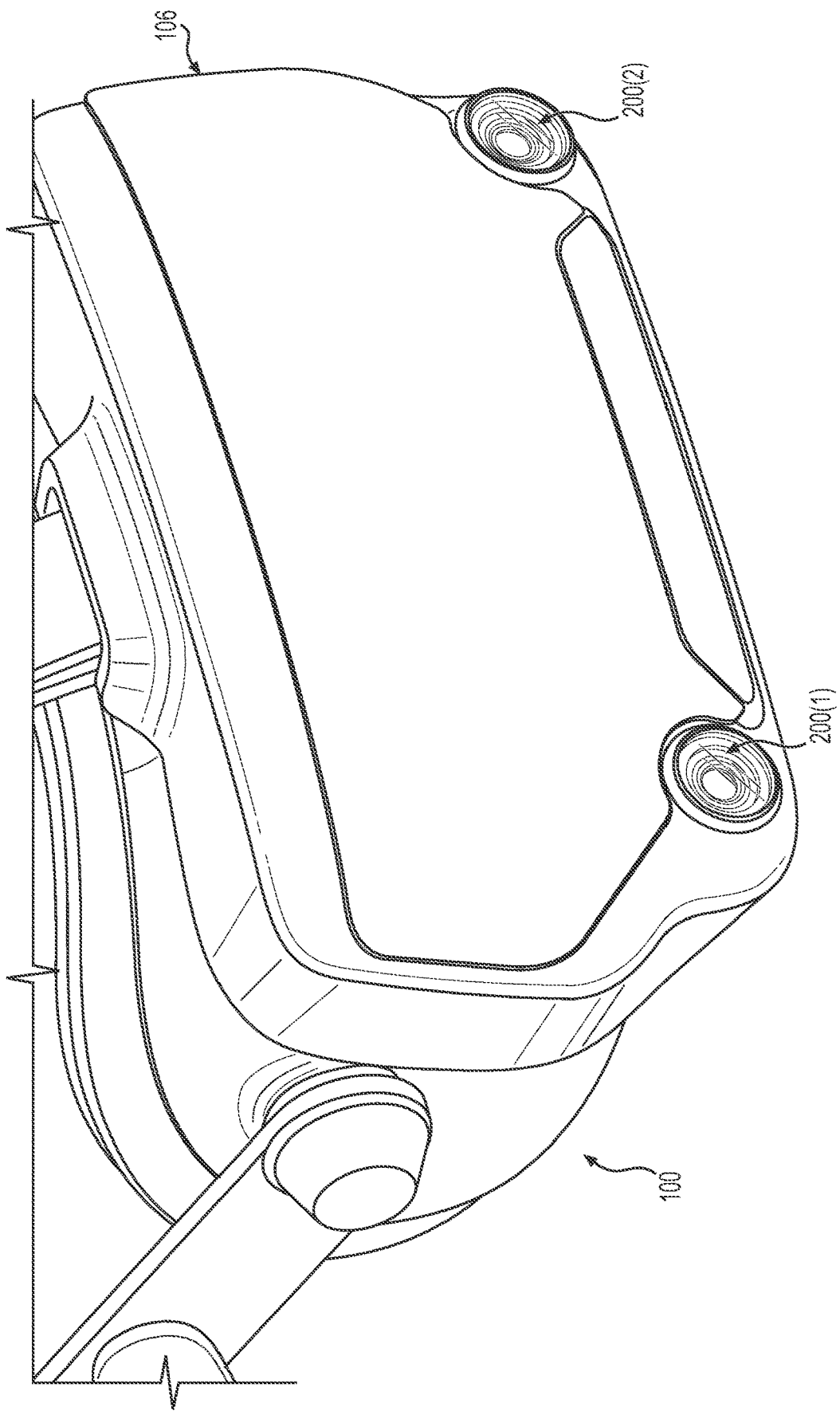
FIG. 2 illustrates a front perspective view of a front portion of the HMD of FIG. 1, according to an embodiment of the present disclosure.

FIG. 2 illustrates a front perspective view of a front portion of the HMD 100 of FIG. 1, according to an embodiment of the present disclosure. As shown in FIG. 2, the HMD 100 may include one or more front-facing cameras 200(1) and/or 200(2). FIG. 2 depicts an embodiment with two front-facing cameras 200 including a first camera 200(1) and a second camera 200(2), but any suitable number of front-facing cameras 200 can be utilized. The front-facing cameras 200 can be used for any suitable purpose, such as optical tracking, pass-through imaging (e.g., projecting images of a real-world environment on the HMD 100, such as by projecting real-world imagery atop a VR scene), obstacle detection (e.g., detecting objects in the real-world environment and possibly warning the user of a potential collision with such objects), recording video of the environment during gameplay, etc. The front-facing camera(s) 200 can be located at any suitable location on the HMD 100, such as on the front of the HMD 100 towards the bottom of the HMD 100 (e.g., in the bottom half of the HMD 100), as shown in FIG. 2.

Figure 3A:
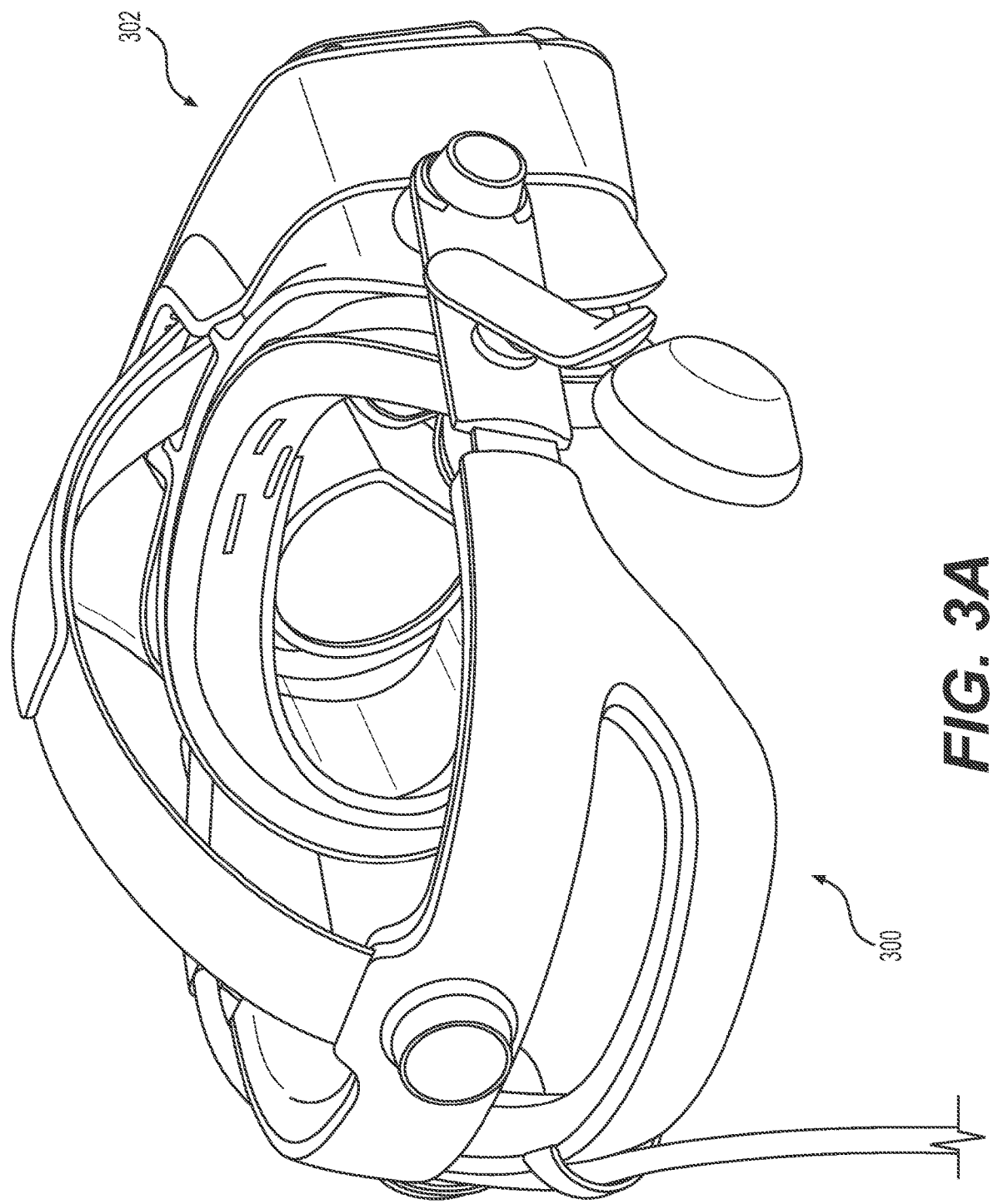
FIG. 3A illustrates a rear perspective view of the example HMD of FIG. 1 in a configuration where a head strap of the HMD is attached to a main unit of the HMD, according to an embodiment of the present disclosure.
Figure 3B:
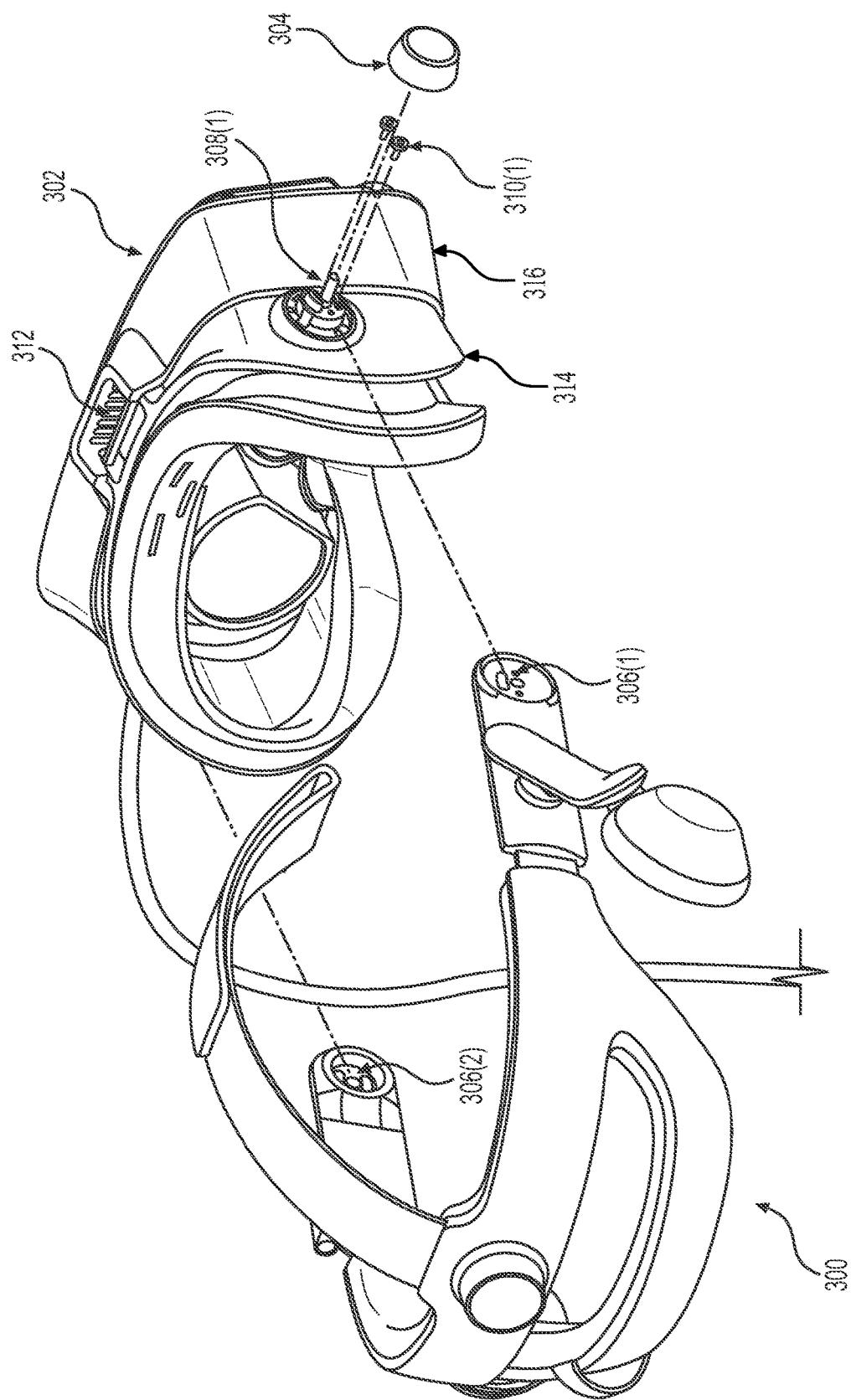
FIG. 3B illustrates the example HMD shown in FIG. 3A in a configuration where the head strap has been removed from the HMD.

FIG. 3A illustrates a rear perspective view of the example HMD 100 of FIG. 1 in a configuration where a head strap 300 of the HMD 100 is attached to a main unit 302 of the HMD 100, according to an embodiment of the present disclosure. FIG. 3B illustrates the example HMD 100 shown in FIG. 3A, except in a configuration where the head strap 300 has been removed from the main unit 302 of the HMD 100. The head strap 300 may be removed, such as to swap, or interchange, the head strap 300 with a different head strap 300. Extended periods of use of the HMD 100 may result in the material of certain portions of the head strap 300 absorbing bodily odors, and, as a result, a user may wish to remove the head strap 300 at times, such as to "air out" the head strap 300, to clean the head strap 300, to replace the head strap 300 with a new head strap. In some cases, a user may wish to interchange, or swap, the head strap 300 with a different type of head strap (e.g., one with different features, such as different headphones, different adjustment mechanisms, etc.). This provides further customization of the HMD 100 for different users.

As shown in FIG. 3B, the head strap 300 may be removed by removing an actuator 304 (e.g., a rotatable knob) located on a side of the HMD 100 to access one or more screws 310(1), or similar fasteners. The removal of the actuator 304 may be accomplished in any suitable manner, such as by forcibly pulling outward on the actuator 304 to remove the actuator 304 from a mounting pin 308(1). The mounting pin 308(1) may be inserted through a main aperture in a portion of the head strap 300, while the one or more screws 310(1) may be screwed into one or more corresponding apertures 306(1) in the portion of the head strap 300 to secure the head strap 300 to the main unit 302. A user can unscrew the screw(s) 310(1), and then slide the portion of the head strap 300 off of the mounting pin 308(1) to remove one side of the head strap 300 from a corresponding side of the main unit 302. On the opposite side of the main unit 302, there may be one or more screws (e.g., similar to the screws 310(1)) that are screwed into one or more corresponding apertures 306(2) in another portion of the head strap 300 in order to secure the head strap 300 to the main unit 302 on the opposite side of the main unit 302. A user can unscrew those screws on the opposite side of the main unit 302 to remove the other side of the head strap 300, and, thus, the entire head strap 300, from the main unit 302. FIG. 3B also shows a belt loop 312 at a top of the main unit 302 of the HMD 100 that is configured to receive a top member of the head strap 300 by looping the top member of the head strap 300 through the belt loop 312 and securing the top member of the head strap 300 to itself. The securing mechanism of the top member of the head strap 300 may be any suitable mechanism, such a hook-and-loop fastener (e.g., Velcro®), snaps, etc. In this manner, the head strap 300 is removable, and may be reattached at will by the user.

Figure 4:
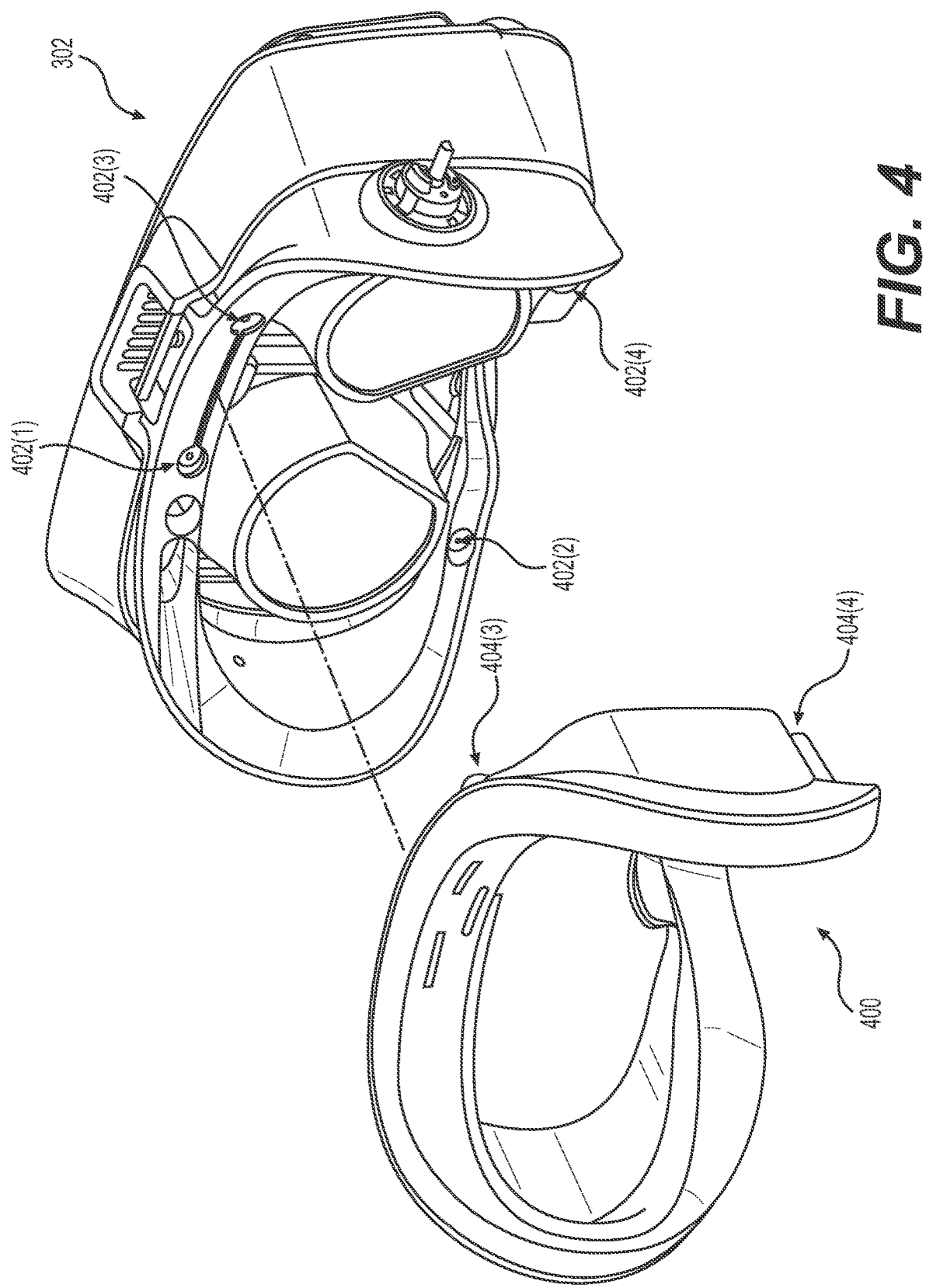
FIG. 4 illustrates a rear perspective view of the main unit of an example HMD of FIG. 1 with a face gasket decoupled from the main unit, according to an embodiment of the present disclosure.

FIG. 4 illustrates a rear perspective view of the main unit 302 of an example HMD 100 of FIG. 1 with a face gasket 400 decoupled from the main unit 302, according to an embodiment of the present disclosure. The face gasket 400 may be removably attached to the main unit 302 of the HMD 100 in any suitable manner, such as by a magnetic coupling mechanism, a hook-and-loop fastener(s) (e.g., Velcro®), pins, screws, hooks, a snap/press fit mechanism, adhesive, or any suitable type of fastener. FIG. 4 depicts an embodiment where a magnetic coupling mechanism(s) is used to removably couple the face gasket 400 to the main unit 302. For example, a plurality of first magnetic elements 402(1)-(4) (e.g., metal screws) disposed on a rear of the main unit 302 may couple with a plurality of second magnetic elements 404(1)-(4) (404(1) and 404(2) not shown in FIG. 4) disposed on a front of the face gasket 400. In this manner, the face gasket 400 can be easily and conveniently secured in, or removed from, the rear of the main unit 302. The face gasket 400 may be padded on a rear of the face gasket 400 to provide a comfortable fit when the HMD 100 is worn. As mentioned, extended periods of use of the HMD 100 may result in the material of particular components, such as the face gasket 400, absorbing bodily odors. As a result, a user may wish to remove the face gasket 400 at times, such as to "air out" the face gasket 400, to clean the face gasket 400, to replace the face gasket 400 with a new face gasket, or the like. In some embodiments, a user may wish to interchange, or swap, the face gasket 400 with a different type of face gasket (e.g., one with different features, profiles, contours, etc.). This allows for even further customization of the HMD 100 for different users.

Figure 5A:
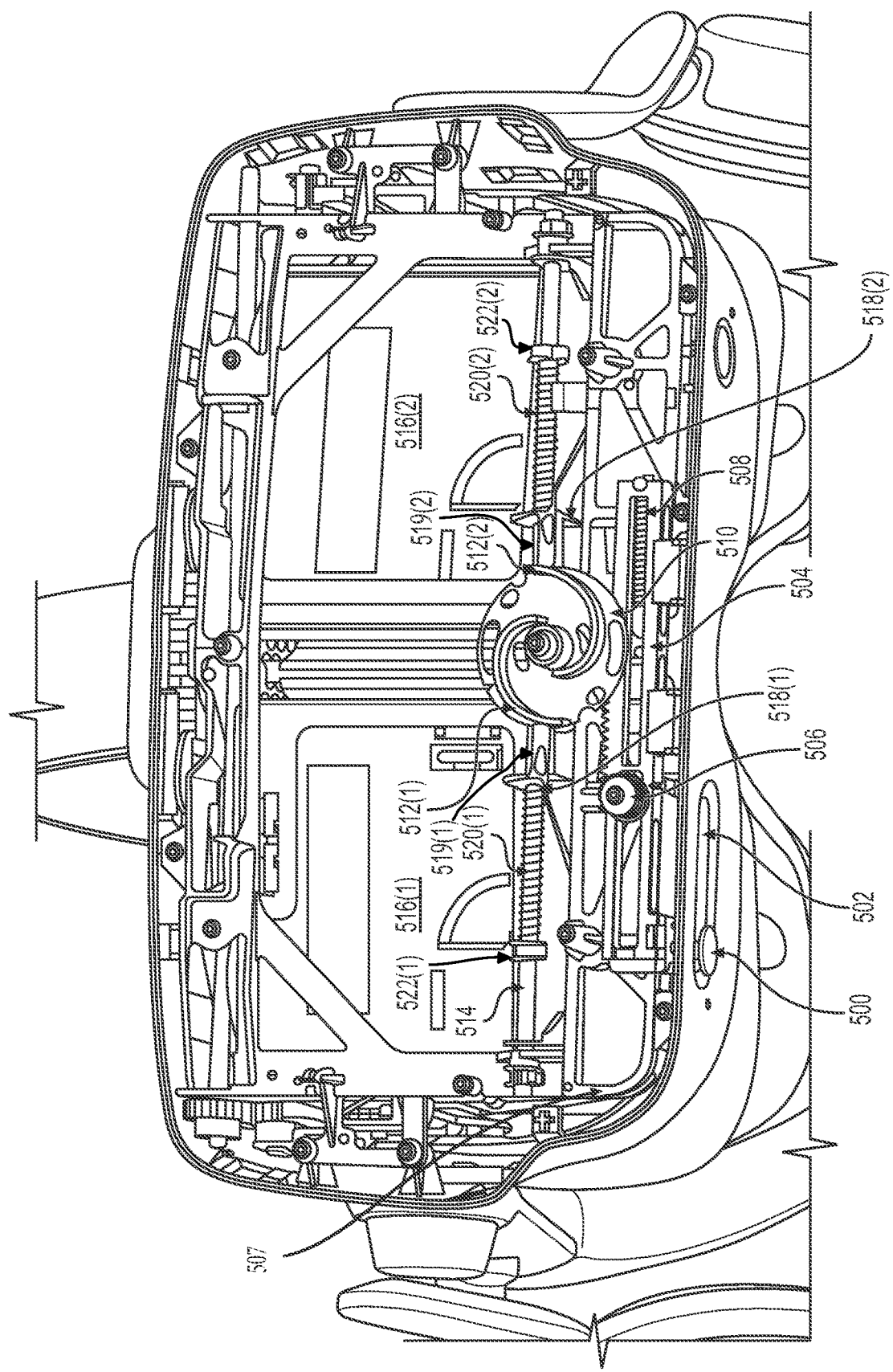
FIG. 5A illustrates a partial front and bottom view of the example HMD of FIG. 1 with a front portion of the HMD housing removed to reveal components of an interpupillary distance (IPD) adjustment mechanism, the IPD adjustment mechanism being adjusted to a first end of an adjustment range in FIG. 5A, according to an embodiment of the present disclosure.
Figure 5B:
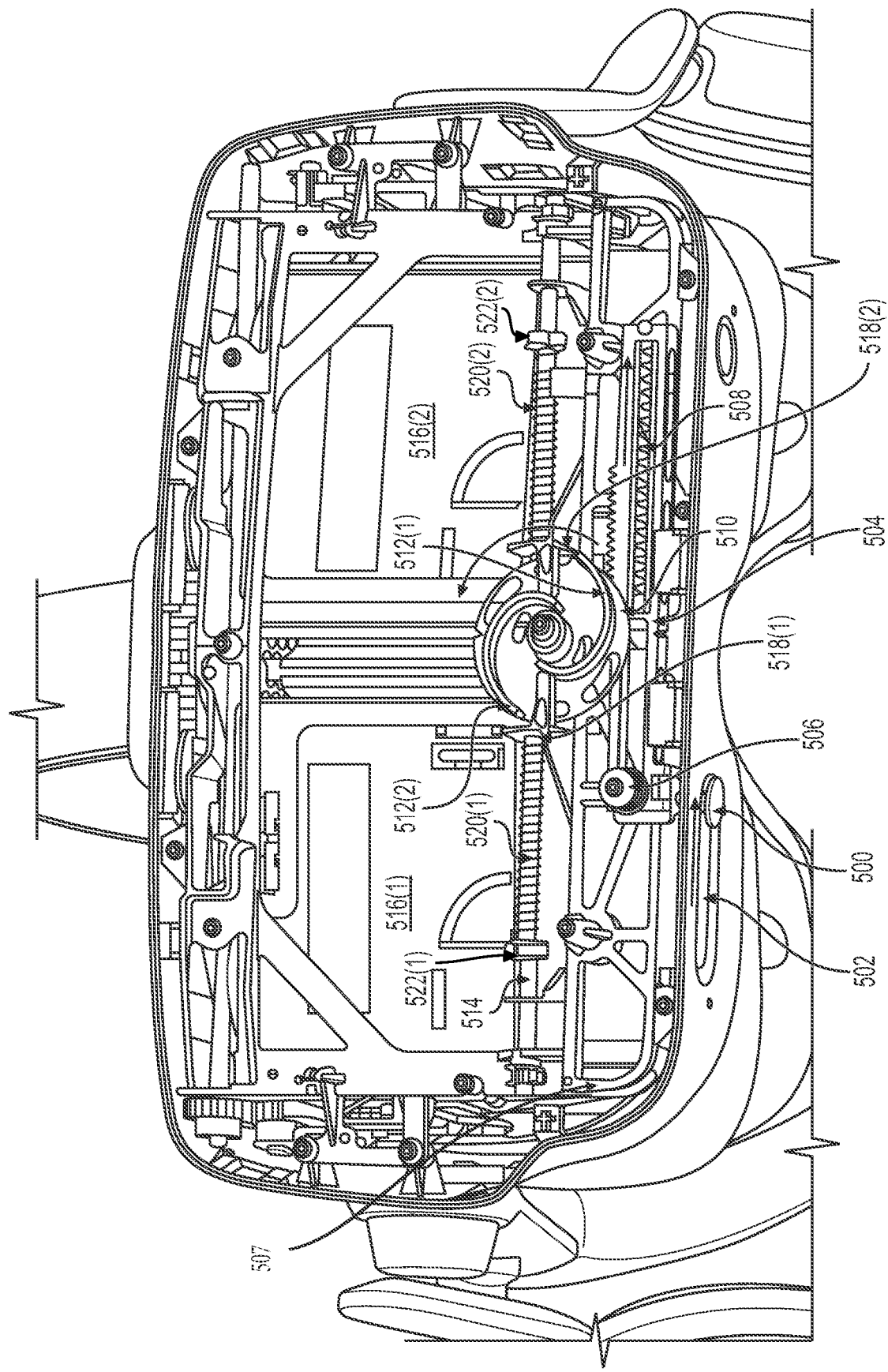
FIG. 5B illustrates the example HMD shown in FIG. 5A, but with the IPD adjustment mechanism adjusted to a second end of an adjustment range in FIG. 5B.
Figure 6A:
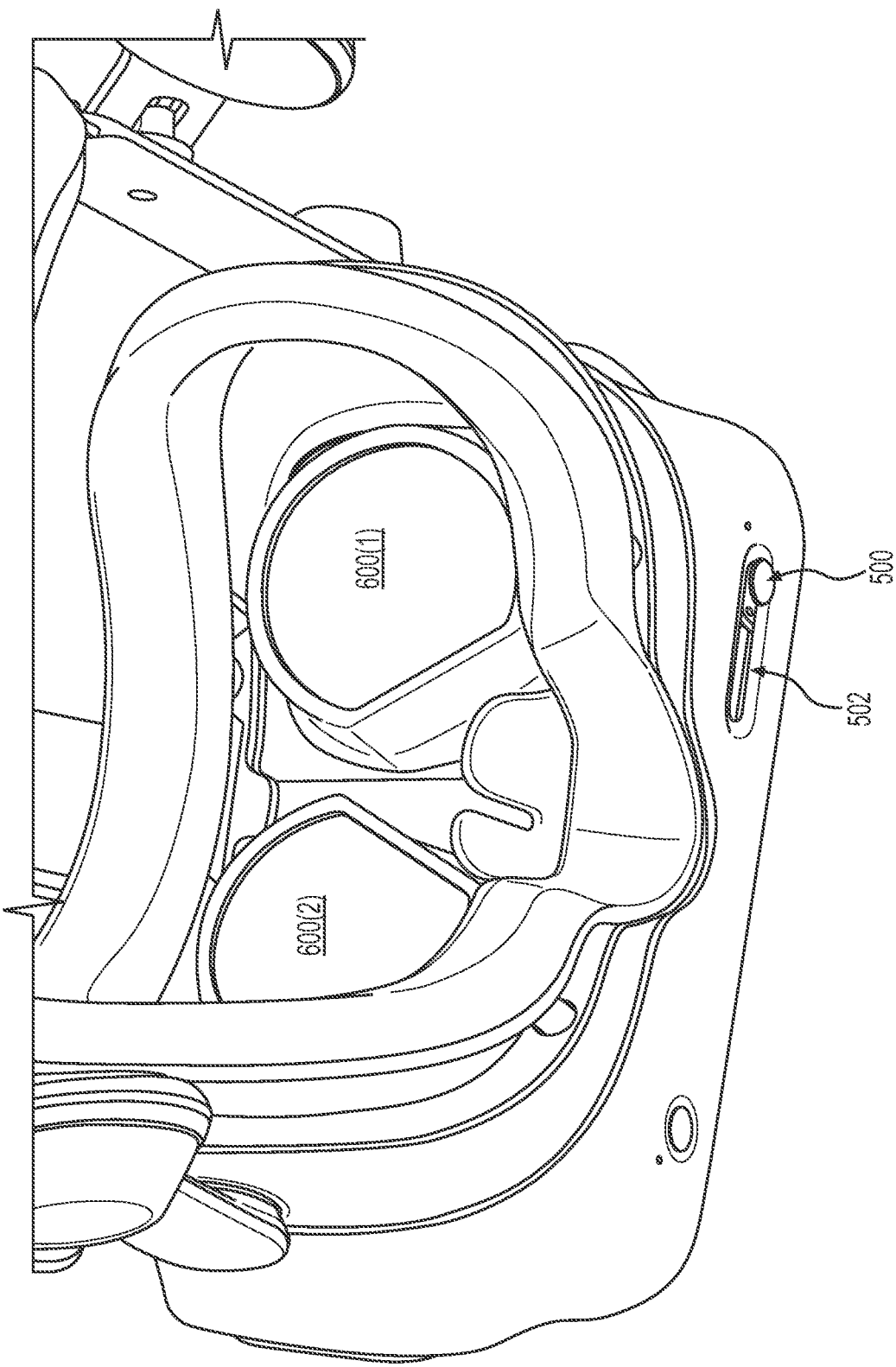
FIG. 6A illustrates a partial rear and bottom view of the example HMD of FIG. 1, the lens tubes being spaced apart a maximum distance of the IPD adjustment range in FIG. 6A, according to an embodiment of the present disclosure.
Figure 6B:
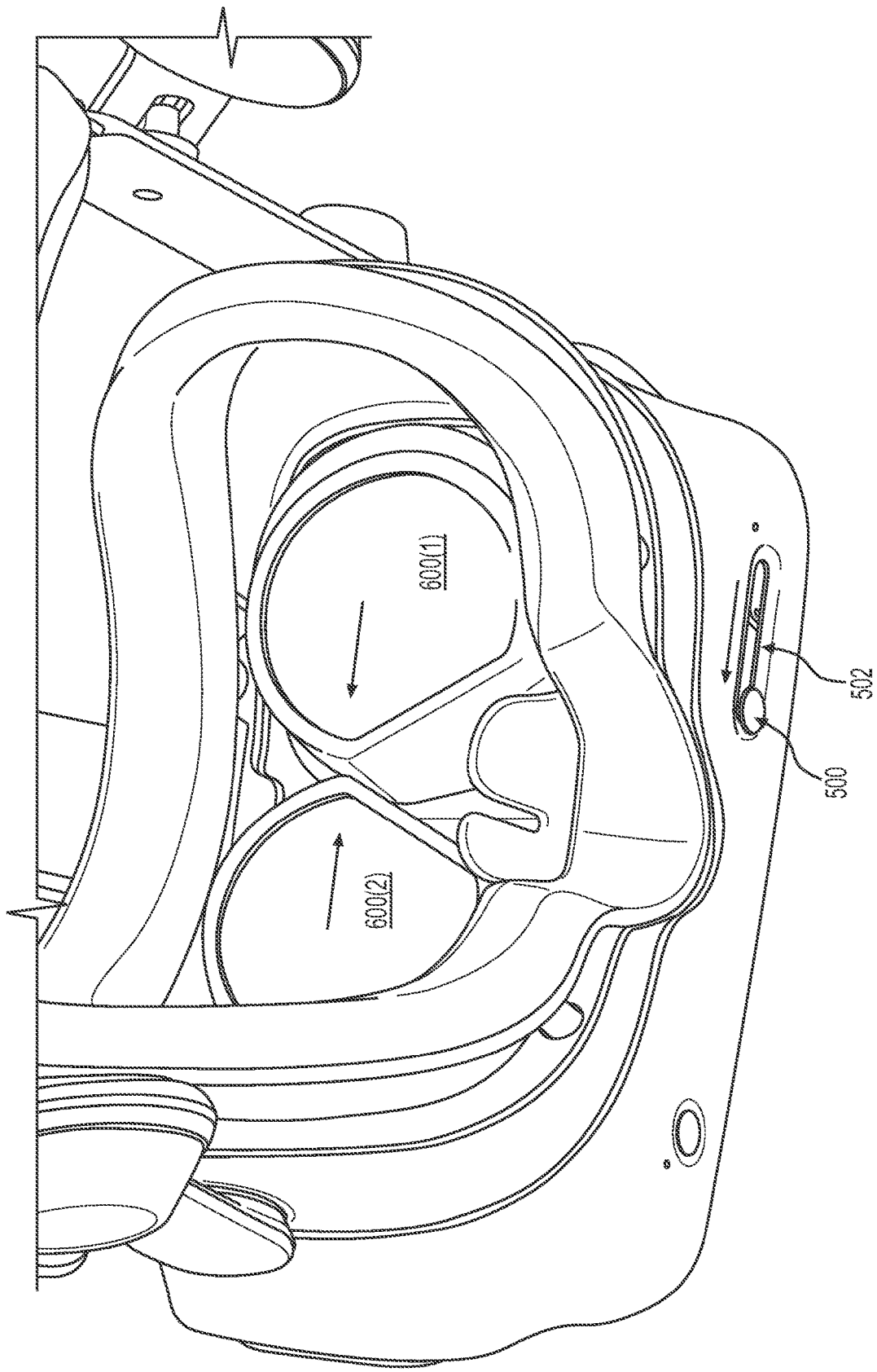
FIG. 6B illustrates the example HMD shown in FIG. 6A, but with the lens tubes spaced apart a minimum distance of the IPD adjustment range in FIG. 6B.

FIG. 5A illustrates a partial front and bottom view of the example HMD 100 of FIG. 1 with a front portion of the HMD housing removed to reveal components of an interpupillary distance (IPD) adjustment mechanism, the IPD adjustment mechanism being adjusted to a first end of an adjustment range in FIG. 5A, and to a second end of the adjustment range in FIG. 5B, according to an embodiment of the present disclosure. The IPD adjustment mechanism of the HMD 100 allows for adjusting the horizontal spacing between a pair of lens tubes of the HMD 100. FIGS. 6A and 6B depict example lens tubes 600(1) and 600(2) (sometimes referred to herein as "lens assemblies") that may be brought closer together or moved farther apart using the IPD adjustment mechanism to decrease or increase, respectively. the horizontal spacing therebetween. Notably, the IPD adjustment mechanism described herein, among other things, is convenient to operate while wearing the HMD 100, is operable using a single hand or finger, and includes a double-biasing assembly to provide smooth, controlled operation of the IPD adjustment mechanism over an adjustment range. This allows for fine tuning the distance between the lens tubes 600(1) and 600(2) to correspond to the IPD of the user.

As shown in FIGS. 5A and 5B, the IPD adjustment mechanism may comprise an actuator 500. The actuator 500 may be located on a bottom of the HMD 100 towards (or within) a right half or a left half of the HMD 100. Although the actuator 500 can be implemented in any suitable way (e.g., a rotatable knob, a lever, a depressible button that toggles between adjustment positions, etc.), the actuator 500 shown in FIGS. 5A and 5B comprises a knob that is slidable (or otherwise movable) within a channel 502 defined in the housing of the HMD 100. The actuator 500 is configured to be actuated by a user of the HMD 100 to adjust the spacing between the lens tubes 600(1) and 600(2) (as depicted in FIGS. 6A and 6B). Accordingly, the actuator 500 is accessible from outside of the housing of the HMD 100. In the example of FIGS. 5A and 5B, moving the actuator 500 to a first end of the channel 502 (e.g., as shown in FIG. 5A) maximizes the horizontal distance (or spacing) between the pair of lens tubes 600 of the HMD 100. Moving the actuator 500 to a second end of the channel 502 (e.g., as shown in FIG. 5B) that is opposite the first end of the channel 502 minimizes the horizontal distance (or spacing) between the pair of lens tubes 600 of the HMD 100. In this manner, users with smaller IPDs can adjust the knob towards the second end of the channel 502 (as shown in FIG. 5B), while users with larger IPDs can adjust the knob towards the first end of the channel 502 (as shown in FIG. 5A). Markings may be provided on the outer surface of the HMD housing along the channel 502 to indicate to a user that the horizontal spacing between the lens tubes 600 is adjustable. Because the actuator 500 and channel 502 are located on either a right half or a left half of the HMD 100, on the bottom of the HMD 100, a user can easily and conveniently slide the actuator 500 within the channel 502 using his/her right or left thumb (e.g., a single hand) to adjust the spacing between the lens tubes 600. The location of the actuator 500 and channel 502, along with its ease of operation, allow the user to adjust the lens tube 600 spacing with a single hand, and to do so while wearing the HMD 100 so that the user does not have to take off the HMD 100 or hold it with two hands while adjusting the lens tube 600 spacing. This allows for attaining the optimal lens tube 600 spacing quicker because the user can wear the HMD 100 while adjusting the lens tube 600 spacing to determine, in real-time, which position of the actuator 500 is optimal for them.

The IPD adjustment mechanism may include components internal to the housing of the HMD 100 that allow for smooth and effortless operation of IPD adjustment mechanism. For example, an end of the actuator 500 that is internal to the HMD housing may be coupled to a movable elongate member 504 at a first end of the elongate member 504. The elongate member 504 may be horizontally oriented and adjacent to the bottom of the HMD 100, as shown in FIGS. 5A and 5B. However, it is to be appreciated that other orientations of the elongate member 504 are possible. A channel or slot may be defined in the elongate member 504 adjacent to an end of the elongate member 504 that is coupled to the actuator 500, and an anchor 506 mounted to a midframe 507 of the HMD 100 may extend through the channel/slot of the elongate member 504 to allow the elongate member 504 to translate bidirectionally (e.g., in a first or second horizontal direction, when the HMD 100 is upright oriented) over the adjustment range of the IPD adjustment mechanism. In this manner, the elongate member 504 is coupled to the midframe 507 of the HMD 100 while being movable bidirectionally.

A first end of a first biasing member 508 may be coupled to a first end of the elongate member 504, and a second end of the first biasing member 508 may be coupled to the midframe 507 of the HMD 100. Here the first end of the elongate member 504 (coupled to the first biasing member 508) is farthest from the actuator 500 while a second end of the elongate member 504 is closest to the actuator 500. The second end of the first biasing member 508 may be attached to the midframe 507 of the HMD 100 at a point that is closer to the actuator 500 than the first end of the elongate member 504 is to the actuator 500. In this manner, the first biasing member 508 is configured to physically bias the elongate member 504 in a horizontal direction by applying a biasing force to the elongate member 504 that resists the movement of the elongate member 504 in a direction of travel of the elongate member 504. In the example of FIGS. 5A and 5B, when the actuator 500 is moved from the left end of the channel 502 to the right end of the channel 502 (from the perspective of FIGS. 5A and 5B), the elongate member 504 is translated in a rightward direction of travel, and the first biasing member 508 resists the rightward movement of the elongate member 504 due to a biasing force applied to the elongate member 504 in the leftward direction (from the perspective of FIGS. 5A and 5B). In some embodiments, the first biasing member 508 is a spring whose biasing force on the elongate member 504 increases as the elongate member 504 is moved farther and farther in the rightward horizontal direction (from the perspective of FIGS. 5A and 5B). This biasing force from the first biasing member 508 causes the sliding movement of the actuator 500 within the channel 502 to be smooth, rather than a jerky movement, when the user slides the actuator 500 within the channel 502. Additionally, or alternatively, one or more friction members may aid in resisting the movement of the actuator 500 within the channel 502 to make the movement smoother and more controlled to fine tune the IPD adjustment with greater ease.

The elongate member 504 may include a plurality of teeth that span at least a portion of the elongate member 504 on a top side of the elongate member 504. The teeth of the elongate member 504 engage with teeth of a rotatable gear 510 (sometimes referred to herein as a "spiral gear") mounted to an axle on the midframe 507 of the HMD 100. The gear 510 may be disposed at or near a middle of the HMD 100 and between a pair of movable frames 516(1) and 516(2), which are coupled to the pair of lens tubes 600. The gear 510 may include a face having a pair of spiral projections 512(1) and 512(2) extending from the face of the gear 510. A rod 514 (sometimes referred to herein as a "sliding rod") may be coupled to the midframe 507 of the HMD 100. The sliding rod 514 may be horizontally oriented (when the HMD 100 is upright oriented) and may substantially span a width of the HMD 100. As mentioned, each lens tube 600 of the pair of lens tubes 600 may be coupled to a corresponding movable frame 516 within the HMD housing, and each movable frame 516 may include a wing member 518 projecting from a back side of the moveable frame 516 that is coupled to the sliding rod 514 (e.g., by the sliding rod 514 passing through an aperture in the wing member 518). In this manner, the pair of lens tubes 600 may be coupled to the rod 514 via the movable frames 516. As shown in FIG. 5A, each wing member 518 may also include a projection 519 that extends horizontally from the wing member 518 towards the gear 510. The projection 519 that extends from the wing member 518 engages one of the spiral projections 512 extending from the face of the gear 510. For example, a first projection 519(1) may extend from the wing member 518(1) and may engage the spiral projection 512(1), while a second projection 519(2) may extend from the wing member 518(2) and may engage the spiral projection 512(2).

A pair of second biasing members 520(1) and 520(2) may be coupled to the sliding rod 514. For example, the second biasing members 520 may comprise springs that are placed over the sliding rod 514 and positioned between a stop 522 on the sliding rod 514 and the wing member 518 of each movable frame 516. FIGS. 5A and 5B show a first stop 522(1), and a second biasing member 520(1) between the first stop 522(1) and the wing member 518(1), as well as a second stop 522(2), and a second biasing member 520(2) between the second stop 522(2) and the wing member 518(2). Each of the second biasing members 520 may be fixed in position relative to the sliding rod 514 at one end of the second biasing member 520 (e.g., at the stop 522 on the sliding rod 514), and the second biasing members 520 may apply a biasing force to the corresponding wing member 518 that is coupled to the sliding rod 514, the biasing force being applied in a direction toward the gear 510 such that the projection 519 that extends horizontally from the wing member 518 is physically biased against the corresponding spiral projection 512 extending from the face of the gear 510. Because the movable frames 516 are movable bidirectionally along the rod 514 between left and right sides of the HMD 100, the movable frames 516, and, hence, the lens tubes 600 coupled to the movable frames 516, are moved in response to actuation of the actuator 500.

As shown in FIGS. 5A and 5B, a user can slide the actuator 500 of the IPD adjustment mechanism within the channel 502, which causes the elongate member 504 to translate in a first direction (e.g., a rightward direction from the perspective of FIGS. 5A and 5B). The teeth of the elongate member 504 that engage with teeth of the gear 510 cause the gear 510 to rotate. In a first rotational direction of the gear 510, the spiral projections 512 extending from the face of the gear 510 may apply a force to the projections 519 extending from the wing members 518 of the movable frames 516 to move the movable frames 516 (and, hence, the lens tubes 600) farther apart to increase the spacing between the lens tubes 600 (as shown in FIG. 5A). In a second rotational direction of the gear 510, the pair of second biasing members 520 apply a biasing force to the wing members 518 of the movable frames 516 to move the movable frames 516 (and, hence, the lens tubes 600) closer together to decrease the spacing between the lens tubes 600 (as shown in FIG. 5B). This is, in part, due to the spiral projections 512 on the gear 510 spiraling inward from respective points at a periphery of the gear 510 to respective points closer to a center of the gear 510 than the respective points at the periphery.

Notably, when the movable frames 516 (and, hence, the lens tubes 600) are moved farther apart, the pair of second biasing members 520 resist the movement of the movable frames 516 in the respective directions of travel of each movable frame 516. This causes the sliding movement of the actuator 500 within the channel 502 to be smooth and controlled movement, rather than a jerky movement, when the user slides the actuator 500 within the channel 502. Thus, the first biasing member 508 and the pair of second biasing members 520 work together to allow for smooth and controlled sliding movement of the actuator 500 within the channel 502 so that the user can fine-tune the IPD adjustment with ease, even while wearing the HMD 100. Additionally, or alternatively, one or more friction members may also aid in resisting the movement of the actuator 500 within the channel 502 to make the movement smoother and easier to fine tune the IPD adjustment. Due to the opposing biasing members and/or friction members, the actuator 500 is movable within the channel 502 to any position within the channel 502, as desired by the user, and when the user removes his/her finger from the actuator 500, the actuator 500 remains stationary at its current position within the channel 502.

As depicted in FIGS. 6A and 6B, actuation of the actuator 500 causes a corresponding adjustment of the spacing between the lens tubes 600 of the HMD 100. For example, moving the actuator 500 to a first end of the channel 502, as shown in FIG. 6A maximizes a horizontal distance (spacing) between the lens tube 600(1) and the lens tube 600(2). The lens tubes 600 may be substantially aligned horizontally. In As shown in FIG. 6B, moving the actuator 500 to a second end of the channel 502 minimizes the horizontal distance (spacing) between the lens tube 600(1) and the lens tube 600(2). Intermediate spacings can be achieved by moving the actuator 500 to an intermediate position within the channel 502. In this sense, the actuator 500 can be moved in a smooth, continuous movement along the channel 502, as opposed to discrete "clicks" between multiple adjustment positions, and the user feels a bidirectional resistance in either direction the actuator 500 is moved due to the double biasing assembly described herein.

Figure 7A:
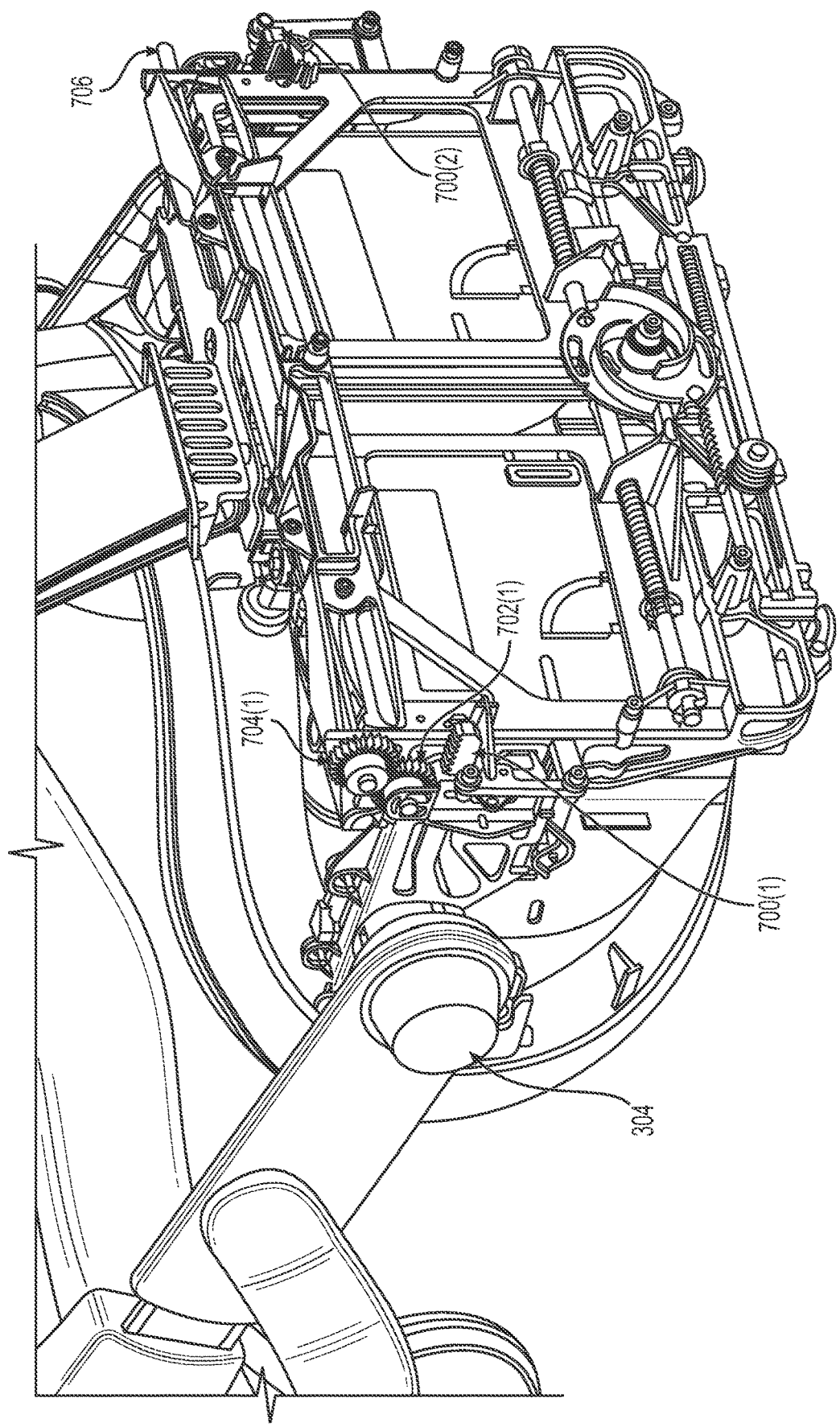
FIG. 7A illustrates a partial front perspective view of the example HMD of FIG. 1 with a portion of the HMD housing removed to reveal components of a field of view (FOV) adjustment mechanism, the FOV adjustment mechanism being adjusted to a first end of an adjustment range in FIG. 7A, according to an embodiment of the present disclosure.
Figure 7B:
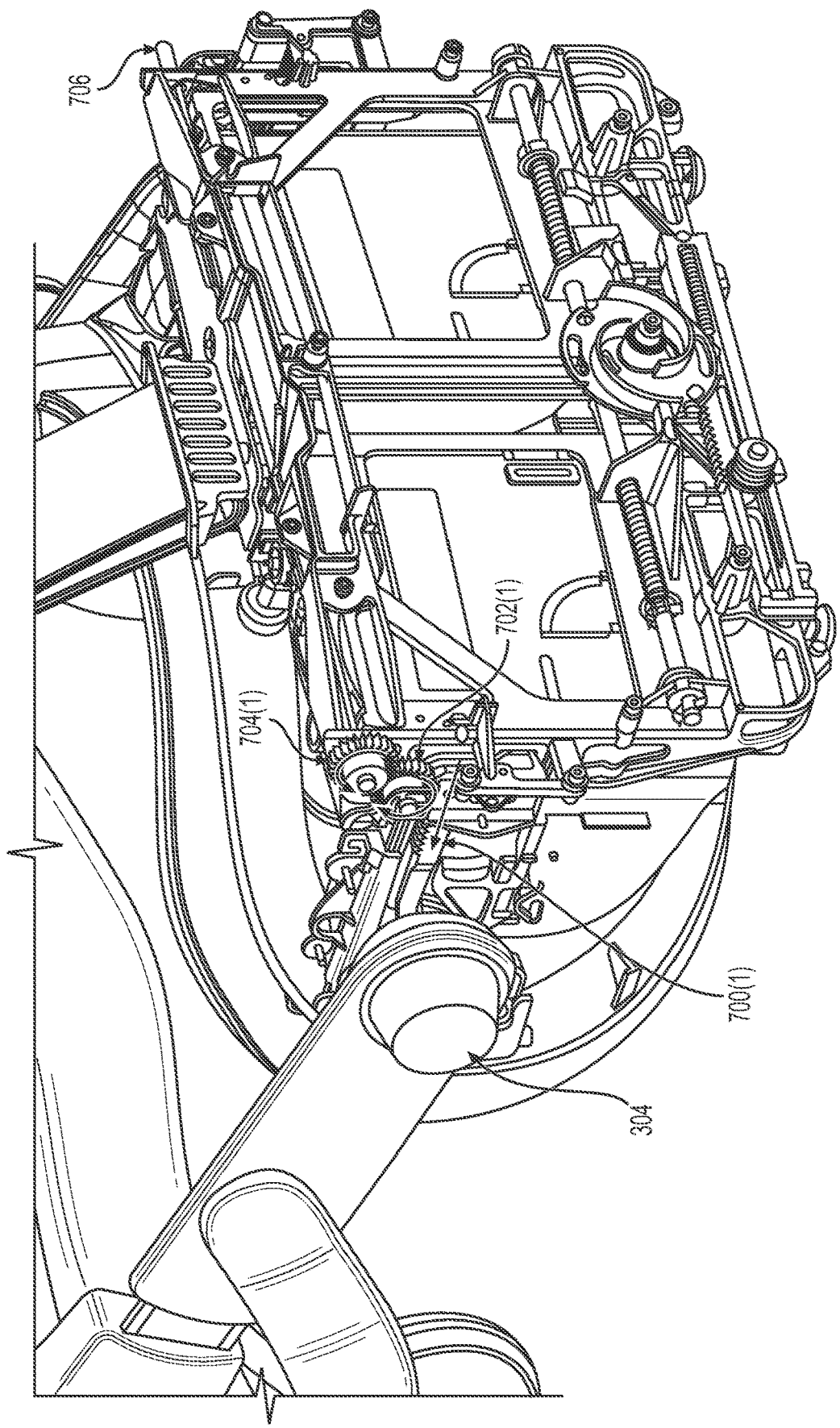
FIG. 7B illustrates the example HMD shown in FIG. 7A, but with the FOV adjustment mechanism adjusted to a second end of the adjustment range in FIG. 7B.

FIG. 7A illustrates a partial front perspective view of the example HMD 100 of FIG. 1 with a portion of the HMD housing removed to reveal components of a field of view (FOV) adjustment mechanism, the FOV adjustment mechanism being adjusted to a first end of an adjustment range in FIG. 7A, according to an embodiment of the present disclosure. FIG. 7B shows the FOV adjustment mechanism being adjusted to a second end of the adjustment range. The FOV adjustment mechanism depicted in FIGS. 7A and 7B allows for adjusting the spacing between the user's face and the lenses or the lens tubes 600 (or display panels) of the HMD 100. This field of view (FOV) adjustment mechanism (sometimes referred to herein as an "eye-relief adjustment mechanism"), among other things, is convenient to operate while wearing the HMD, is operable using a single hand, and smoothly adjusts (e.g., increases or decreases) the distance between the lenses of the HMD 100 and the user's face over an adjustment range. The FOV adjustment mechanism may comprise an actuator 304 disposed on a first side (of two sides; namely, right and left sides) of the HMD 100. In general, the actuator 304 is configured to be actuated by a user of the HMD 304, and, accordingly, the actuator 304 is accessible from outside of the HMD housing.

Although the actuator 304 is shown as a rotatable actuator (e.g., a rotatable knob) in FIGS. 7A and 7B, the actuator 304 may include any suitable adjustable element such as, without limitation, a dial, a lever, a wheel, and/or a slider (or slidable knob). The actuator 304 may be located where the head strap 300 adjoins the main unit 302 of the HMD 100. The actuator 304 may be actuated (e.g., rotated) over an adjustment range such that the actuator can be actuated (e.g., rotated) in a first direction to a first end of the adjustment range to minimize the distance (or spacing) between the lenses and the user's face, and actuated (e.g., rotated) in a second direction that is opposite the first direction to a second end of the adjustment range to maximize the distance (or spacing) between the lenses and the user's face. In this manner, the FOV and/or the eye relief can be optimized for different users. Markings may be provided on the outer surface of the HMD housing around, or on, the actuator 304 to indicate to a user that the spacing between the lenses and the user's face is adjustable. Because the actuator 304 is located on one side (e.g., the right side or the left side) of the HMD 100, a user can easily and conveniently actuate the actuator 304 using his/her right or left hand (e.g., a single hand) to adjust the spacing between the lenses and the user's face. The location of the actuator 304, along with its ease of operation, allow the user to adjust the FOV and/or the eye relief with a single hand, and to do so while wearing the HMD 100 so that the user does not have to take off the HMD 100 or hold it with two hands while adjusting the FOV and/or eye relief. This allows for attaining the optimal FOV and/or eye relief quicker because the user can wear the HMD 100 while adjusting the FOV and/or eye relief to determine, in real-time, which position of the actuator 304 is optimal for them.

The FOV adjustment mechanism includes components internal to the housing of the HMD 100 that allow for uniform, smooth, controlled, and/or effortless operation of FOV adjustment mechanism. The actuator 304 (e.g., a rotatable knob), in addition to being rotatable, may be depressible between a first position and a second position by pushing on the actuator 304, much like a depressible button. A biasing member may bias the actuator 304 in an outward direction relative to the HMD 100 such that, when a user is not pressing on the actuator 304, the actuator 304 is physically biased in a first position where the actuator 304 is extended (i.e., not depressed). When the actuator 304 is extended, a projection (or tooth) is engaged with a detent, of a plurality of detents internal to the actuator 304, which locks the actuator 304 in the sense that the actuator 304 is prevented from being rotated in either direction (clockwise or counterclockwise) over the adjustment range. A user can move the actuator 304 to a second position where the actuator 304 is depressed, which unlocks the actuator 304 by disengaging the projection from a detent internal to eh actuator 304. In this second position, while depressing the actuator 304, the user can rotate the actuator 304 to adjust the spacing between the lenses and the user's face, as needed. Upon letting go of the actuator 304, or relieving the pressure upon the actuator 304, the biasing member internal to the actuator 304 physically biases the actuator 304 in the extended, first position to engage the projection with a detent, which locks the actuator 304 in position (rotationally). This locking mechanism prevents unwanted adjustment of the spacing between the lenses and the user's face, such as during gameplay when the user wants the FOV and/or eye relief to remain fixed at a desired position.

The actuator 304 may cause rotation of a pair of gear assemblies on each side of the HMD 100 that are connected by a connecting rod 706. The pair of gear assemblies allow for adjusting the lenses closer to, or farther from the user's face. Specifically, the main unit 302 of the HMD 100 may include a first portion that is coupled to the lens tubes 600, and a second portion that is movable relative to the first portion. For example, the second portion of the HMD 100 may be the portion of the main unit 302 that is closer to (e.g., in contact with) the user's face while the user is wearing the HMD 100. Referring briefly to FIG. 3B, this second portion 314 is the portion of the main unit 302 that the actuator 304 is disposed on. The first portion 316 of the HMD 100 may be the portion of the main unit 302 that is farther from (e.g., not in contact with) the user's face while the user is wearing the HMD 100. For example, the first portion 316 of the HMD 100 may include, without limitation, the lens tubes 600, the display panels, a PCB with electrical components mounted thereon, etc. These first and second portions of the HMD 100 are movable bidirectionally, and relative to each other by rotational actuation of the actuator 304.

A first gear assembly disposed on the same side of the HMD 100 as the actuator 304 may be coupled to the actuator 304 and to both the first portion 316 of the HMD 100 and the second portion 314 of the HMD 100 that are movable bidirectionally, and relative to each other. The first gear assembly may include a first rotatable gear 702(1) having teeth that engage teeth of an elongate member 700(1). The elongate member's 700(1) teeth may be disposed on a top side of the elongate member 700(1). The elongate member 700(1) may be oriented such that the elongate member 700(1) extends in a direction from a back of the HMD 100 to a front of the HMD 100. The elongate member 700(1) may be coupled to, or engaged with, the actuator 304, and the elongate member 700(2) may also be coupled to the second portion 314 of the HMD 100 that is closer to the user's face than the first portion 316 of the HMD 100. Because the elongate member 700(1) is coupled to the second portion 314 of the HMD 100, when the actuator 304 is rotated, the elongate member 700(1) translates forward or backward to cause second portion 314 of the HMD 100 (the portion closer to the user's face) to translate forward or backward relative to the first portion 316 of the HMD 100 (the portion farther from the user's face that includes the lenses, the displays, and the PCB.

The elongate member 700(1) may also include teeth that engage teeth of the first gear 702(1), the first gear 702(1) being mounted to an axle on the midframe of the HMD 100. The first gear 702(1) of the first gear assembly engages with a second rotatable gear 704(1) of the first gear assembly, and the second gear 704(1) is coupled to the rod 706 (sometimes referred to herein as a "connecting rod"). The connecting rod 706 may be coupled to the midframe of the HMD, and the connecting rod 706 may be horizontally oriented and may substantially span a width of the HMD 100. The connecting rod 706 also connects the first gear assembly to a second gear assembly, which is disposed on a second side of the HMD 100 opposite the first side of the HMD 100 where the first gear assembly is disposed. Rotation of the second gear 704(1) of the first gear assembly causes a corresponding rotation of the connecting rod 706.

The second gear assembly may include a third rotatable gear that is coupled to the connecting rod 706, much like the second gear 704(1) of the first gear assembly is connected to the connecting rod 706 at the opposite end of the rod 706. Rotation of the connecting rod 706 causes a corresponding rotation of this third gear of the second gear assembly. This third gear of the second gear assembly engages with a fourth rotatable gear of the second gear assembly, the fourth gear of the second gear assembly much like the first gear 700(1) of the first gear assembly. Accordingly, the fourth gear of the second gear assembly may similarly be mounted to an axle on the midframe of the HMD 100. Teeth of the fourth gear engage with teeth of a second elongate member 700(2) of the second gear assembly. This second elongate member 700(2) may also have teeth on a top side of the elongate member 700(2), and the elongate member 700(2) of the second gear assembly may similarly be attached to the second portion 314 of the HMD 100 (the portion closer to the user's face) that is movable relative to the first portion 316 of the HMD 100 (the portion farther from the user's face that includes the lenses, the displays, and the PCB), except that the second elongate member 700(2) is coupled to the second portion 314 of the HMD 100 on the opposite side of the second portion 314, as compared to the side where the first elongate member 700(1) is coupled to the second portion 314 of the HMD 100.

Accordingly, as the actuator 304 is rotated, both elongate members 700(1) and 700(2) of the respective gear assemblies translate forward or backward, depending on the direction of rotation of the actuator 304, to cause the first and second portions of the HMD 100 to translate in opposite directions relative to each other, thereby adjusting the FOV and/or eye relief. For example, the first portion 316 of the HMD 100 (the portion farther from the user's face that includes the lenses, the displays, and the PCB) may move relative to the second portion 314 of the HMD 100 (the portion closer to the user's face) in a first direction away from the second portion 314, or in a second direction toward the second portion 314. Controlling the movement of these HMD portions using elongate members 700(1) and 700(2) on opposing sides of the HMD 100 that are connected by a connecting rod 706 allows for uniform translation of the first and second portions of the HMD 100 relative to each other without any wobbling (or racking) of these portions as they translate bidirectionally forward and backward. This smooth, uniform adjustment provided by the FOV (or eye-relief) adjustment mechanism allows for convenient operation by a user, using a single hand, while wearing the HMD 100.

Figure 8:
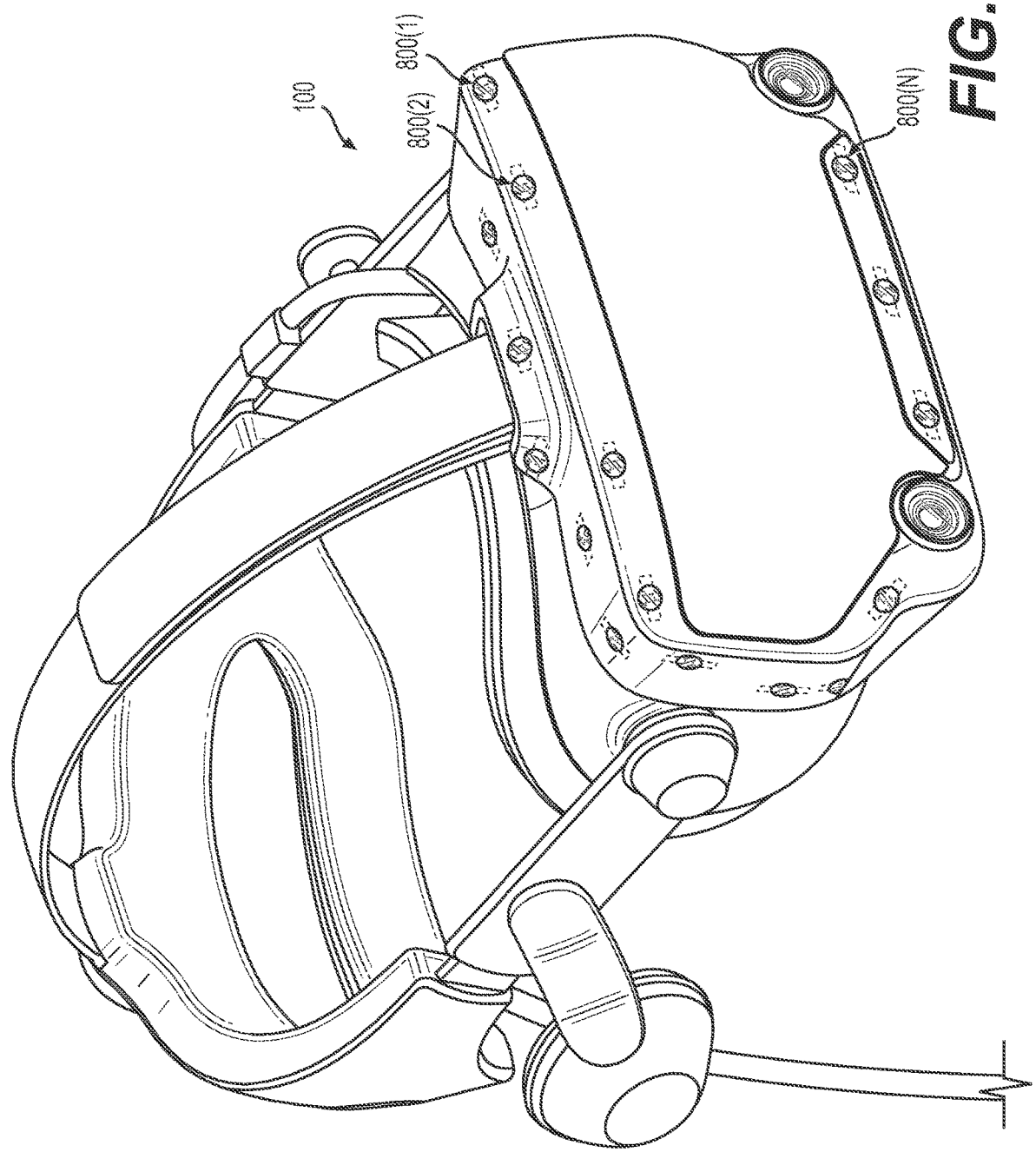
FIG. 8 illustrates a front perspective view of the example HMD of FIG. 1, FIG. 8 depicting example locations of inconspicuous spectrum-transmissive windows in the housing of the HMD, according to an embodiment of the present disclosure.
Figure 9:
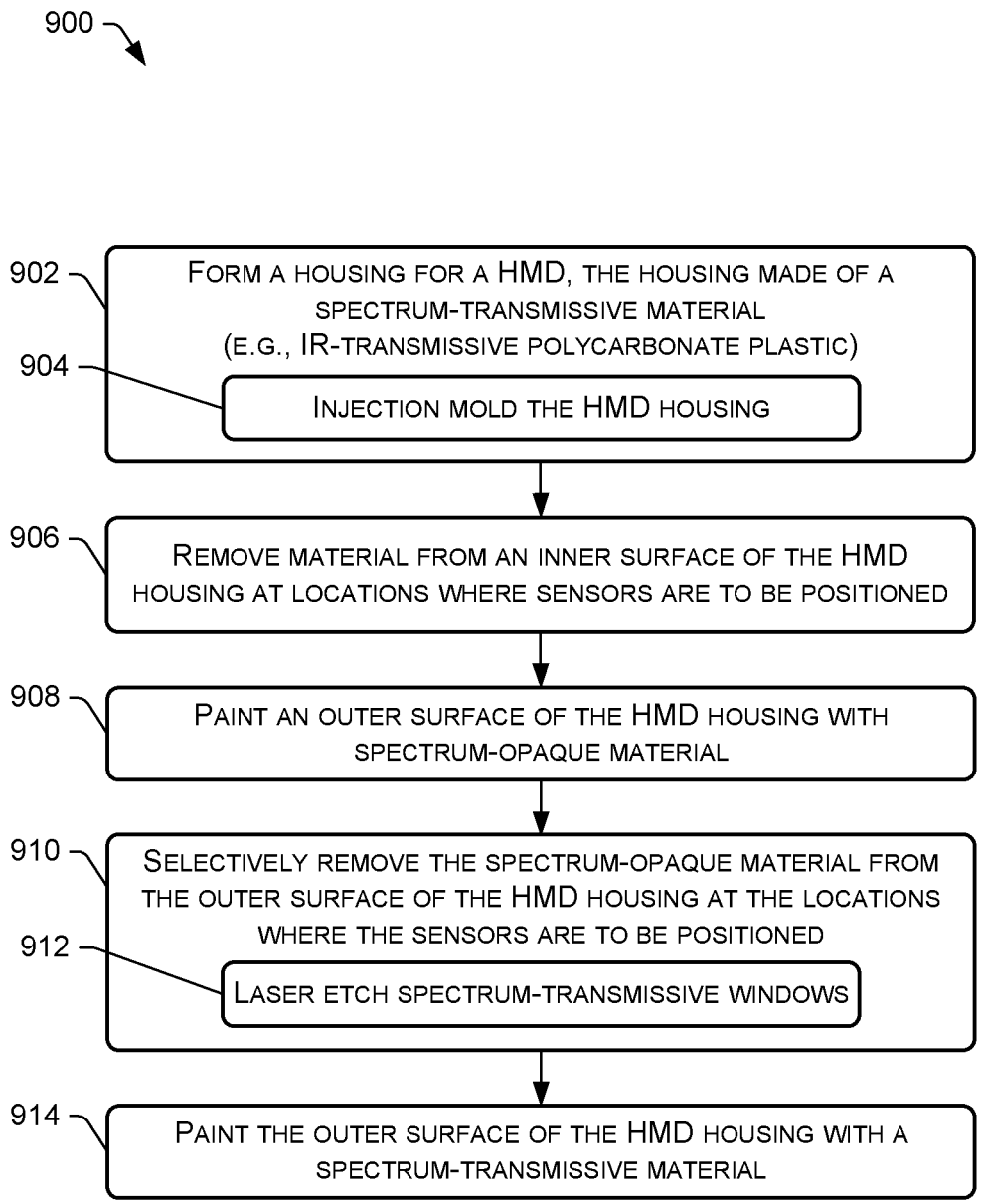
FIG. 9 is a flowchart of an example process for manufacturing a housing of a HMD having at least one spectrum-transmissive window, according to an embodiment of the present disclosure.

FIG. 8 illustrates a front perspective view of the example HMD 100 of FIG. 1, FIG. 8 depicting example locations of inconspicuous spectrum-transmissive windows 800(1)-(N) (collectively 800, N being any suitable integer) in the housing of the HMD 100, according to an embodiment of the present disclosure. In some embodiments, a plurality of corresponding spectrum-specific sensors are mounted inside the HMD housing behind the spectrum-transmissive windows 800 as shown by the dashed lines behind each window 800. The sensors within the HMD housing are sensitive to light in a specific spectrum. In some embodiments, the spectrum-transmissive windows 800 are infrared (IR)-transmissive windows, and the spectrum-specific sensors positioned behind the windows 800 are IR sensors (i.e., sensors configured to detect light in the IR spectrum). Although the examples herein predominantly pertain to IR-transmissive windows and IR sensors, it is to be appreciated that any mention herein of "IR-transmissive" may be replaced with "spectrum-transmissive" for spectrums other than the IR spectrum, and "IR sensors" may be replaced with "spectrum-specific sensors" to describe sensors configured to detect electromagnetic radiation in spectrums other than the IR spectrum. Furthermore, instead of sensors, a plurality of corresponding spectrum-specific beacons may be mounted inside the HMD housing behind the spectrum-transmissive windows 800, the beacons configured to emit light (electromagnetic radiation) in a specific spectrum.

Accordingly, the HMD 100 may comprise a housing made of a spectrum-transmissive (IR-transmissive) material, wherein an outer surface of the housing is coated with an IR-opaque material, and wherein one or more locations on the outer surface are devoid of the IR-opaque material, the location(s) corresponding to the windows 800. One or more spectrum-specific sensors (and/or beacons) may be disposed behind the housing at the one or more locations corresponding to the windows 800. In some embodiments, the outer surface of the HMD housing is also coated with a spectrum-transmissive coating that covers the spectrum-opaque material and the one or more locations on the outer surface that are devoid of the spectrum-opaque material. Any suitable IR-transmissive and IR-opaque materials known to a person having ordinary skill in the art can be used herein to create IR-transmissive windows 800 that allow electromagnetic radiation (light) in the IR spectrum to pass therethrough. For example, IR-opaque materials may include acrylics or paints that are configured to block electromagnetic radiation in the IR spectrum. An IR-transmissive polycarbonate plastic can be used for the based material of the HMD housing.

The thickness of the housing at the location(s) of the window(s) 800 may be thinner than a thickness of the remainder of the HMD housing. In this manner, if sensors are mounted to an inner surface of the HMD housing directly behind the windows 800, the sensors can be brought closer to the outer surface of the HMD housing to minimize the size of the window 800. That said, the size of each spectrum-transmissive window 800 may be configurable based on the tolerances for placement of the corresponding sensor behind the spectrum-transmissive window 800. In some embodiments, a spectrum-specific sensor is mounted inside the HMD housing using adhesive behind a corresponding spectrum-transmissive window 800. The spectrum-transmissive window 800 may be configured to filter out (or block) electromagnetic radiation in at least one spectrum (e.g., the visible spectrum), while allowing electromagnetic radiation in a specific spectrum (e.g., light in the IR spectrum) to pass through the window 800.

As shown in FIG. 8, a plurality of spectrum-transmissive windows 800 may be provided on the housing of the HMD 100. At least some of the plurality of spectrum-transmissive windows 800 may be located on a front of the HMD 100 along a top, along a bottom, and/or along one or more sides of the front of the HMD 100. At least some of the windows 800 may be located on a top of the HMD 100, a bottom of the HMD 100, and/or on one or more sides of the HMD 100, as shown in FIG. 8. Covering the HMD 100 in this manner provides for optimal tracking using an optical tracking system, which may include one or more beacons that emit electromagnetic radiation in the specific spectrum. For example, one or more beacons positioned in an environment of the HMD 100 may sweep beams (e.g., fan beams) of IR light across a play space, and the IR sensors disposed inside the HMD housing behind the IR-transmissive windows 800 may detect the beam sweeps, and possibly synchronization pulses emitted by the optical tracking system.

The processes described herein are illustrated as a collection of blocks in a logical flow graph, which represent a sequence of operations. The order in which the operations are described is not intended to be construed as a limitation, and any number of the described blocks can be combined in any order and/or in parallel to implement the processes.

To process for manufacturing a HMD housing that includes a plurality of spectrum-transmissive windows 800 may include, at 902, forming a HMD housing made of a spectrum-transmissive material (e.g., an IR-transmissive polycarbonate plastic). As shown by sub-block 904, forming the housing may include injection molding the HMD housing using an injection molding technique.

At 906, material may be removed from the inner surface of the HMD housing at the locations where spectrum-transmissive windows 800 are to be made. This removal of material decreases the thickness of the HMD housing only at the locations where the spectrum-specific sensors (and/or beacons) are to be positioned (e.g., mounted), thereby allowing the sensors/beacons to be brought closer to the outer surface of the HMD housing when positioned next to (e.g., mounted on) the inner surface of the HMD housing, behind the spectrum-transmissive windows 800. Positioning the sensors closer to the outer surface in this manner allows for achieving a field of view (FOV) for the sensors with particular angular range while minimizing the size of the spectrum-transmissive windows 800. In some embodiments, removing material from the inner surface creates recessions in the HMD housing where the sensors/beacons are to be positioned (e.g., mounted). Removing material from the inner surface of the HMD housing also allows for keeping the outer surface flat and smooth (as opposed to creating recessions in the outer surface of the HMD housing).

At 908, the outer surface of the HMD housing can be painted with a spectrum-opaque material (e.g., coating the outer surface of the housing with an IR-opaque film). This may include painting substantially the entirety of the outer surface of the HMD housing to cover the outer surface with the spectrum-opaque material.

At 910, the spectrum-opaque material can be selectively removed from the outer surface at locations behind which the sensors/beacons are to be mounted. This creates spectrum-transmissive windows 800 in the HMD housing. As shown by sub-block 912, the selective material removal may include removing the spectrum-opaque material using a laser etching technique. In some embodiments, a circular portion of spectrum-opaque material is removed to create a circular spectrum-transmissive window 800 (sometimes referred to herein as an "aperture") in the HMD housing. In some embodiments, a photolithography process can be used at block 910 to remove the spectrum-opaque material from the outer surface at the locations of the sensors/beacons. In some embodiments, removing spectrum-opaque material at block 910 can include placing stickers on the outer surface of the HMD housing at locations where the spectrum-transmissive windows 800 are to be made prior to block 908, then painting the outer surface of the HMD housing with the spectrum-opaque material at block 908, and removing the stickers at block 910 to selectively remove the spectrum-opaque material at the sticker locations to create spectrum-transmissive windows 800 where the stickers were located. In some embodiments, a fixture having a pattern of pins can be moved to a position where the pins are brought into contact with the outer surface of the HMD housing prior to block 908, and, while the pins are contacting the outer surface, painting the outer surface of the HMD housing with the spectrum-opaque material at block 908, and, removing the pins from the HMD housing at block 910 to selectively "remove" the spectrum-opaque material at the locations where the pins were located to create spectrum-transmissive windows 800 at those locations. Yet another way of creating spectrum-transmissive windows 800 may be to apply an oleophobic coating on the HMD housing in a particular pattern prior to block 908, then paint the outer surface of the HMD housing with the spectrum-opaque material at block 908, at which point the spectrum-opaque material adheres to portions of the outer surface that are free from the oleophobic coating, and does not adhere to portions of the outer surface that are coated with the oleophobic coating.

At 914, after removing the spectrum-opaque material at selective locations, the outer surface of the HMD housing may be painted with a spectrum-transmissive coating (e.g., a hard, clear coat material (or film) that is IR-transmissive) to create a HMD housing with a smooth outer surface and spectrum-transmissive windows 800 that are barely visible to the naked eye, even in broad daylight. In low-light environments, the spectrum-transmissive windows 800 are at least inconspicuous, if not invisible to the naked eye, and the outer surface of the HMD housing has a smooth appearance.

The disclosed process for manufacturing a HMD housing that includes a plurality of spectrum-transmissive windows 800 is more cost effective than manufacturing a similar HMD housing using a so-called "double shot" injection molding process, which involves fabricating a majority of the HMD housing from IR-opaque plastic, and fabricating small portions of the HMD housing from IR-transmissive plastic to create windows over IR sensors mounted inside the HMD housing. By contrast, the disclosed manufacturing process for creating spectrum-transmissive (e.g., IR-transmissive) windows 800 on a HMD housing involves using a generally spectrum-transmissive material as the base material for the HMD housing, and then coating the majority of the HMD housing with an spectrum-opaque material, which is more cost effective way, as compared to the double-shot process, to manufacture a HMD housing that includes a plurality of spectrum-transmissive windows 800. Since the HMD housing is made from a spectrum-transmissive material, some light of the specific spectrum (e.g., IR light, if the specific spectrum is the IR spectrum) may pass through a spectrum-transmissive window 800 to the underlying sensor while some light of the specific spectrum may be internally reflected within the HMD housing itself. As a result, there is a possibility that some light of the specific spectrum received through one spectrum-transmissive window 800(1) may reach a nearby sensor (e.g., a sensor behind window 800(2)) due to these internal reflections. To mitigate the impact of internally reflected light of the specific spectrum on a nearby spectrum-specific sensor, the spectrum-transmissive material used as the base material for the HMD housing may be modified with an additive material that makes the HMD housing slightly more absorptive of the light of the specific spectrum (e.g., slightly more IR absorptive), which mitigates the extent of internal reflections.

Another way of manufacturing a HMD housing that includes a plurality of spectrum-transmissive windows involves using a so-called "in-mold label." For example, a spectrum-transmissive ink (e.g., IR-transmissive ink) can be printed on a plastic sheet in a particular pattern corresponding to the positioning of the spectrum-transmissive windows on the to-be-formed HMD housing, the sheet with the spectrum-transmissive ink printed thereon can be thermoformed into a desired shape for the HMD housing, and then a spectrum-opaque material can be over-molded onto the thermoformed sheet to create a HMD housing with spectrum-transmissive windows. Yet another way of manufacturing a HMD housing that includes a plurality of spectrum-transmissive windows involves a so-called "laser direct structuring" technique. For example, a HMD housing may be injection molded, and a laser beam may be used to create a recessed pattern in the HMD housing, and a metallization process may plate a metal onto the recessed pattern in the HMD housing to create spectrum-transmissive windows in the HMD housing.

As mentioned, the thickness of the HMD housing at the locations of the spectrum-transmissive windows 800 may be made as thin as possible (e.g., by using a subtractive manufacturing process that removes material from the inner surface of the HMD housing at those locations) while a remainder of the HMD housing can maintain a greater thickness to provide rigidity to the HMD housing. Having locally-thinned portions of the HMD housing where the spectrum-specific sensors/beacons are located means that the sensors can be positioned closer to the outer surface of the HMD housing, which reduces the amount of refraction and the amount of optical artifacts as light of the specific spectrum passes through the spectrum-transmissive windows 800. Because the sensors/beacons disposed behind the windows 800 can be used in an optical tracking system that tracks the pose of the HMD 100 as it moves within a volume, the reduction of refraction and optical artifacts means that a more accurate spectrum-specific (e.g., IR) beam sweep window is achieved. Furthermore, the size of the spectrum-transmissive windows may restrict the angular range over which each spectrum-specific sensor receives light of the specific spectrum, and/or the angular range over which a spectrum-specific beacon can emit light of the specific spectrum. In some embodiments, the spectrum-transmissive windows 800 are sized such that the sensors receive, and/or the beacons emit, light of the specific spectrum over an angular range of about 120 degrees. A goal may be to make the size of each spectrum-transmissive window 800 as small as possible (e.g., for aesthetic purposes), without overly restricting the angular range over which the sensor receives, and/or the beacon emits, the light of the specific spectrum. In some embodiments, the diameter of an individual spectrum-transmissive window may be within a range of 4 millimeters to 7 millimeters, or within a range of 6 millimeters to 6.5 millimeters.

It is to be appreciated that optical tracking of the HMD 100 is merely one example use of the spectrum-specific sensors/beacons and the spectrum-transmissive windows 800 described herein. For example, a spectrum-specific camera (e.g., an IR camera) may be mounted internally within the HMD housing and underlying a spectrum-transmissive window to remain inconspicuous when the HMD 100 is fully assembled. Such cameras may be tracking cameras, or any other type of sensor that is configured to detect electromagnetic radiation of a specific spectrum.

The foregoing may also be understood in view of the following clauses:

1. A head-mounted display (HMD) comprising:
a rod coupled to a midframe of the HMD;
a first movable frame coupled to the rod and to a first lens tube, the first movable frame being movable bidirectionally along the rod in a first direction toward a left side of the HMD or in a second direction toward a right side of the HMD;
a second movable frame coupled to the rod and to a second lens tube, the second movable frame being movable bidirectionally along the rod in the first direction or in the second direction;
an actuator on a bottom of the HMD, the actuator configured to be actuated by a user of the HMD;
a movable elongate member coupled to the actuator and to the midframe, the movable elongate member being movable bidirectionally in the first direction or in the second direction;
a first biasing member coupled to the movable elongate member and to the midframe, the first biasing member configured to physically bias the movable elongate member in at least one of the first direction or the second direction;
a rotatable gear coupled to the midframe and disposed between the first movable frame and the second movable frame, the rotatable gear being engaged with the movable elongate member;
a second biasing member coupled to the rod, the second biasing member configured to physically bias the first movable frame against a first spiral projection extending from a face of the rotatable gear; and
a third biasing member coupled to the rod, the third biasing member configured to physically bias the second movable frame against a second spiral projection extending from the face of the rotatable gear,
wherein actuation of the actuator causes movement of the movable elongate member in one of the first direction or the second direction, which causes the rotatable gear to rotate, which causes the first movable frame and the second movable frame to move in opposite directions for adjusting a spacing between the first lens tube and the second lens tube.

2. The HMD of clause 1, wherein the actuator comprises a knob that is slidable within a channel defined in a housing of the HMD.

3. The HMD of clause 1, wherein the actuator is located on at least one of a right half of the HMD or a left half of the HMD.

4. The HMD of clause 1, wherein the first spiral projection and the second spiral projection spiral inward from respective points at a periphery of the rotatable gear to respective points closer to a center of the rotatable gear than the respective points at the periphery.

5. The HMD of clause 1, wherein:
the first movable frame includes a first wing member projecting from a back side of the first movable frame, the first wing member including a first aperture;
the first movable frame is coupled to the rod by the rod passing through the first aperture in the wing member;
the second movable frame includes a second wing member projecting from a back side of the second movable frame, the second wing member including a second aperture; and
the second movable frame is coupled to the rod by the rod passing through the second aperture in the wing member.

6. A head-mounted display (HMD) comprising:
a pair of lens tubes, the pair of lens tubes comprising a first lens tube and a second lens tube;
a rod coupled to a midframe of the HMD;
a pair of movable frames that are coupled to the pair of lens tubes, each movable frame being movable bidirectionally along the rod in a first direction toward a left side of the HMD or in a second direction toward a right side of the HMD;
an actuator accessible from outside of a housing of the HMD;
a movable elongate member coupled to the actuator and to the midframe;
a first biasing member coupled to the movable elongate member and to the midframe, the first biasing member configured to resist movement of the movable elongate member in a direction of travel of the elongate member;
a rotatable gear coupled to the midframe and disposed between the pair of movable frames, the rotatable gear being engaged with the movable elongate member; and
a pair of second biasing members coupled to the rod, the pair of second biasing members configured to physically bias the pair of movable frames against a pair of spiral projections extending from a face of the rotatable gear.

7. The HMD of clause 6, wherein the actuator comprises a knob that is slidable within a channel defined in the housing of the HMD.

8. The HMD of clause 6, wherein the actuator is located on at least one of a right half of the HMD or a left half of the HMD.

9. The HMD of clause 6, wherein the pair of spiral projections spiral inward from respective points at a periphery of the rotatable gear to respective points closer to a center of the rotatable gear than the respective points at the periphery.

10. The HMD of clause 6, wherein:
each movable frame of the pair of movable frames includes a wing member projecting from a back side of the movable frame, the wing member including an aperture; and
the rod passes through the aperture in the wing member of each movable frame.

11. The HMD of clause 10, wherein the pair of second biasing members are springs that are disposed on the rod, each spring extending between a stop coupled to the rod and the wing member of a corresponding one of the pair of movable frames.

12. The HMD of clause 6, wherein the movable elongate member is coupled to the midframe by an anchor that extends through a channel defined in the movable elongate member.

13. A wearable display comprising:
a rod coupled to a midframe of the wearable display;
a pair of movable frames that are coupled to a pair of lens assemblies and are movable bidirectionally along the rod in a first direction toward a left side of the wearable display or in a second direction toward a right side of the wearable display;

an actuator accessible from outside of a housing of the wearable display;

a movable elongate member coupled to the actuator and to the midframe;

a first biasing member coupled to the movable elongate member and to the midframe, the first biasing member configured to resist movement of the movable elongate member in a direction of travel of the elongate member;

a rotatable gear coupled to the midframe and disposed between the pair of movable frames, the rotatable gear being engaged with the movable elongate member and having a face with a pair of spiral projections extending from the face of the rotatable gear; and a pair of second biasing members coupled to the rod, the pair of second biasing members configured to physically bias the pair of movable frames against the pair of spiral projections.

14. The wearable display of clause 13, wherein the actuator comprises a knob that is movable within a channel defined in the housing of the wearable display.

15. The wearable display of clause 14, wherein movement of the knob to a first end of the channel minimizes a spacing between the pair of lens assemblies, and movement of the knob to a second end of the channel maximizes the spacing.

16. The wearable display of clause 13, wherein the actuator is located on at least one of a right half of the wearable display or a left half of the wearable display.

17. The wearable display of clause 13, wherein:
each movable frame of the pair of movable frames includes a wing member projecting from a back side of the movable frame, the wing member including an aperture; and
the rod passes through the aperture in the wing member of each movable frame.

18. The wearable display of clause 17, wherein the pair of second biasing members are springs that are disposed on the rod, each spring extending between a stop coupled to the rod and the wing member of a corresponding one of the pair of movable frames.

19. The wearable display of clause 13, wherein the movable elongate member is coupled to the midframe by an anchor that extends through a channel defined in the movable elongate member.

20. The wearable display of clause 13, wherein the first biasing member is a spring that is coupled to a first end of the movable elongate member that is farthest from the actuator, and wherein the spring is coupled to the midframe at a point that is closer to the actuator than the first end of the movable elongate member is to the actuator.

21. A head-mounted display (HMD) comprising:
a pair of lens tubes coupled to a first portion of the HMD;
an actuator disposed on a first side of the HMD, the actuator configured to be actuated by a user of the HMD;
a first gear assembly disposed on the first side of the HMD and coupled to the actuator, to the first portion of the HMD, and to a second portion of the HMD, the second portion of the HMD being movable bidirectionally relative to the first portion of the HMD;
a second gear assembly disposed on a second side of the HMD opposite the first side of the HMD and coupled to the first portion of the HMD and to the second portion of the HMD; and
a rod connecting the first gear assembly to the second gear assembly, wherein actuation of the actuator causes movement of the first portion of the HMD relative to the second portion of the HMD in a first direction away from the second portion of the HMD or in a second direction toward the second portion of the HMD.

22. The HMD of clause 21, wherein:
the first gear assembly comprises a first elongate member coupled to the second portion of the HMD and to the actuator, the first elongate member movable bidirectionally in the first direction or the second direction; and
the second gear assembly comprises a second elongate member coupled to the second portion of the HMD, the second elongate member movable bidirectionally in the first direction or in the second direction.

23. The HMD of clause 22, wherein:
the first gear assembly further comprises a first rotatable gear and a second rotatable gear;
the first elongate member is engaged with the first rotatable gear;
the first rotatable gear is engaged with the second rotatable gear;
the second rotatable gear is coupled to the rod;
the second gear assembly further comprises a third rotatable gear and a fourth rotatable gear;
the third rotatable gear is coupled to the rod;
the third rotatable gear is engaged with the fourth rotatable gear; and
the fourth rotatable gear is engaged with the second elongate member.

24. The HMD of clause 22, wherein:
the first elongate member comprises a first plurality of teeth on a top side of the first elongate member that are engaged with teeth of the first rotatable gear; and
the second elongate member comprises a second plurality of teeth on a top side of the second elongate member that are engaged with teeth of the fourth rotatable gear.

25. The HMD of clause 21, wherein the actuator is a rotatable knob.

26. The HMD of clause 25, wherein:
the rotatable knob is depressible between a first position where the rotatable knob is not depressed and a second position where the rotatable is depressed;
the rotatable knob is physically biased in the first position by a biasing member;
a detent is engaged by a projection while the rotatable knob is in the first position to prevent the rotatable knob from being rotated; and
the rotatable knob is rotatable while the rotatable knob is in the second position such that the projection is not engaged with the detent, or a different detent.

27. A head-mounted display (HMD) comprising:
a pair of lens assemblies coupled to a first portion of the HMD;
an actuator disposed on a first side of the HMD, the actuator accessible from outside of a housing of the HMD; and
a pair of gear assemblies disposed on opposite sides of the HMD, connected by a connecting rod, and coupled to a second portion of the HMD that is movable relative to the first portion of the HMD, wherein a gear assembly of the pair of gear assemblies that is disposed on the first side is further coupled to the actuator.

28. The HMD of clause 27, wherein:
the gear assembly disposed on the first side is a first gear assembly comprising a first elongate member coupled to the second portion of the HMD and to the actuator, the first elongate member movable bidirectionally in a first direction from a front of the HMD towards a back of the HMD, or in a second direction from the back of the HMD towards the front of the HMD; and the second gear assembly comprises a second elongate member coupled to the second portion of the HMD, the second elongate member movable bidirectionally in the first direction or in the second direction.

29. The HMD of clause 28, wherein:

the first gear assembly further comprises a first rotatable gear and a second rotatable gear;

the first elongate member is engaged with the first rotatable gear;

the first rotatable gear is engaged with the second rotatable gear;

the second rotatable gear is coupled to the connecting rod;

the second gear assembly further comprises a third rotatable gear and a fourth rotatable gear;

the third rotatable gear is coupled to the connecting rod;

the third rotatable gear is engaged with the fourth rotatable gear; and the fourth rotatable gear is engaged with the second elongate member.

30. The HMD of clause 28, wherein:

the first elongate member comprises a first plurality of teeth on a top side of the first elongate member that are engaged with teeth of the first rotatable gear; and the second elongate member comprises a second plurality of teeth on a top side of the second elongate member that are engaged with teeth of the fourth rotatable gear.

31. The HMD of clause 27, wherein the actuator is a rotatable knob.

32. The HMD of clause 31, wherein:

the rotatable knob is depressible between a first position where the rotatable knob is not depressed and a second position where the rotatable is depressed;

the rotatable knob is physically biased in the first position by a biasing member;

a detent is engaged by a projection while the rotatable knob is in the first position to prevent the rotatable knob from being rotated; and the rotatable knob is rotatable while the rotatable knob is in the second position such that the projection is not engaged with the detent, or a different detent.

33. A wearable display comprising:

a pair of lens assemblies coupled to a first portion of the wearable display;

a rotatable knob disposed on a first side of the wearable display, the rotatable knob accessible from outside of a housing of the wearable display; and a pair of gear assemblies disposed on opposite sides of the wearable display, connected by a connecting rod, and coupled to a second portion of the wearable display that is movable relative to the first portion of the wearable display, wherein a gear assembly of the pair of gear assemblies that is disposed on the first side is further coupled to the rotatable knob.

34. The wearable display of clause 33, wherein:

the gear assembly disposed on the first side is a first gear assembly comprising a first elongate member coupled to the second portion of the wearable display and to the rotatable knob, the first elongate member movable bidirectionally in a first direction from a front of the wearable display towards a back of the wearable display, or in a second direction from the back of the wearable display towards the front of the wearable display; and the second gear assembly comprises a second elongate member coupled to the second portion of the wearable display, the second elongate member movable bidirectionally in the first direction or in the second direction.

35. The wearable display of clause 34, wherein:

the first gear assembly further comprises a first rotatable gear and a second rotatable gear;

the first elongate member is engaged with the first rotatable gear;

the first rotatable gear is engaged with the second rotatable gear;

the second rotatable gear is coupled to the connecting rod;

the second gear assembly further comprises a third rotatable gear and a fourth rotatable gear;

the third rotatable gear is coupled to the connecting rod;

the third rotatable gear is engaged with the fourth rotatable gear; and the fourth rotatable gear is engaged with the second elongate member.

36. The wearable display of clause 34, wherein:

the first elongate member comprises a first plurality of teeth on a top side of the first elongate member that are engaged with teeth of the first rotatable gear; and the second elongate member comprises a second plurality of teeth on a top side of the second elongate member that are engaged with teeth of the fourth rotatable gear.

37. The wearable display of clause 33, wherein the second portion of the wearable display is closer to a face of the user when the user is wearing the wearable display, and the first portion of the wearable display is farther from the face of the user when the user is wearing the wearable display.

38. The wearable display of clause 33, wherein:

the rotatable knob is depressible between a first position where the rotatable knob is not depressed and a second position where the rotatable is depressed; and the rotatable knob is physically biased in the first position by a biasing member.

39. The wearable display of clause 38, wherein:

a detent is engaged by a projection while the rotatable knob is in the first position to prevent the rotatable knob from being rotated; and the rotatable knob is rotatable while the rotatable knob is in the second position such that the projection is not engaged with the detent, or a different detent.

40. The wearable display of clause 33, wherein a spacing between a face of a user of the wearable display and the pair of lens assemblies is adjustable using the rotatable knob while the user is wearing the wearable display without the user having to actuate any additional actuators.

41. A head-mounted display (HMD) comprising:

a housing made of an infrared (IR)-transmissive material, wherein an outer surface of the housing is coated with an IR-opaque material, and wherein one or more locations on the outer surface are devoid of the IR-opaque material to provide one or more IR-transmissive windows on the housing; and one or more IR sensors are disposed inside the housing behind the one or more IR-transmissive windows.

42. The HMD of clause 41, wherein the outer surface is coated with an IR-transmissive coating that substantially covers the IR-opaque material and the one or more locations on the outer surface that are devoid of the IR-opaque material.

43. The HMD of clause 41, wherein a thickness of the housing at the one or more locations is thinner than a thickness of a remainder of the housing.

44. The HMD of clause 41, wherein the one or more IR sensors are mounted to an inner surface of the housing behind the one or more locations on the outer surface.

45. The HMD of clause 41, wherein the one or more locations on the outer surface that are devoid of the IR-opaque material are circular in shape to provide circular IR-transmissive windows in the housing.

45. The HMD of clause 41, wherein the housing is the housing of a main unit of the HMD, and the housing includes a plurality of IR-transmissive windows.

46. The HMD of clause 45, wherein at least some of the IR-transmissive windows are located on front of the HMD.

47. A method of manufacturing a head-mounted display (HMD) having at least one window that allows electromagnetic radiation in a specific spectrum to pass through the at least one window, the method comprising:
  forming a housing for the HMD out of a first material that is configured to allow the electromagnetic radiation in the specific spectrum to pass therethrough;
  painting an outer surface of the housing with a second material that is configured to block the electromagnetic radiation in the specific spectrum; and
  removing the second material from at least one location on the outer surface.

48. The method of clause 47, wherein removing the second material comprises laser etching the second material away from the outer surface.

49. The method of clause 47, further comprising removing material from an inner surface of the housing behind the at least one location on the outer surface to decrease a thickness of the housing at the at least one location.

50. The method of clause 47, further comprising coating the outer surface with the first material or a third material that is configured to allow the electromagnetic radiation in the specific spectrum to pass therethrough.

51. The method of clause 47, wherein forming the housing comprises injection molding the housing.

52. The method of clause 47, further comprising mounting at least one sensor configured to detect the electromagnetic radiation in the specific spectrum on an inner surface of the housing behind the at least one location on the outer surface.

53. The method of clause 47, further comprising mounting at least one beacon configured to emit the electromagnetic radiation in the specific spectrum on an inner surface of the housing behind the at least one location on the outer surface.

54. The method of clause 47, wherein the specific spectrum is the infrared (IR) spectrum.

55. The method of clause 54, wherein the first material comprises an IR-transmissive polycarbonate plastic.

56. An electronic device comprising:
  a housing made of a spectrum-transmissive material that is configured to allow electromagnetic radiation in a specific spectrum to pass therethrough, wherein an outer surface of the housing is coated with an spectrum-opaque material that is configured to block the electromagnetic radiation in the specific spectrum, and wherein one or more locations on the outer surface are devoid of the spectrum-opaque material to provide one or more spectrum-transmissive windows on the housing; and
  one or more spectrum-specific components disposed inside the housing behind the one or more spectrum-transmissive windows.

57. The electronic device of clause 56, wherein the outer surface is coated with a spectrum-transmissive coating that substantially covers the spectrum-opaque material and the one or more locations on the outer surface that are devoid of the spectrum-opaque material.

58. The electronic device of clause 56, wherein the one or more spectrum-specific components are at least one of sensors that detect the electromagnetic radiation in the specific spectrum, or beacons that emit the electromagnetic radiation in the specific spectrum.

59. The electronic device of clause 56, wherein a thickness of the housing at the one or more locations is thinner than a thickness of a remainder of the housing.

60. The electronic device of clause 56, the specific spectrum is the infrared (IR) spectrum.

CONCLUSION

While various examples and embodiments are described individually herein, the examples and embodiments may be combined, rearranged and modified to arrive at other variations within the scope of this disclosure. In addition, although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A head-mounted display (HMD) comprising:
  a rod coupled to a midframe of the HMD;
  a first movable frame coupled to the rod and to a first lens tube, the first movable frame being movable bidirectionally along the rod;
  a second movable frame coupled to the rod and to a second lens tube, the second movable frame being movable bidirectionally along the rod;
  an actuator on a bottom of the HMD, the actuator configured to be actuated by a user of the HMD;
  a movable elongate member coupled to the actuator and to the midframe, the movable elongate member being movable bidirectionally in a first direction or in a second direction;
  a first biasing member coupled to the movable elongate member and to the midframe, the first biasing member configured to physically bias the movable elongate member in at least one of the first direction or the second direction as the movable elongate member moves;
  a rotatable gear coupled to the midframe and disposed between the first movable frame and the second movable frame, the rotatable gear being engaged with the movable elongate member;
  a second biasing member coupled to the rod, the second biasing member configured to physically bias the first movable frame against the rotatable gear; and
  a third biasing member coupled to the rod, the third biasing member configured to physically bias the second movable frame against the rotatable gear,
  wherein actuation of the actuator causes movement of the movable elongate member in one of the first direction or the second direction, which causes the rotatable gear to rotate, which causes the first movable frame and the second movable frame to move in opposite directions for adjusting a spacing between the first lens tube and the second lens tube.

2. The HMD of claim 1, wherein the actuator comprises a knob that is slidable within a channel defined in a housing of the HMD.

3. The HMD of claim 1, wherein the actuator is located on at least one of a right half of the HMD or a left half of the HMD.

4. The HMD of claim 1, wherein:
the rotatable gear comprises:
  a first spiral projection extending from a face of the rotatable gear, and
  a second spiral projection extending from the face of the rotatable gear;
the second biasing member is configured to physically bias the first movable frame against the first spiral projection; and
the third biasing member is configured to physically bias the second movable frame against the second spiral projection.

5. The HMD of claim 4, wherein the first spiral projection and the second spiral projection spiral inward from respective points at a periphery of the rotatable gear to respective points closer to a center of the rotatable gear than the respective points at the periphery.

6. A head-mounted display (HMD) comprising:
a rod coupled to a midframe of the HMD;
a pair of lens tubes coupled to the rod, each lens tube being movable bidirectionally along the rod;
an actuator accessible from outside of a housing of the HMD;
a movable elongate member coupled to the actuator and to the midframe;
a first biasing member coupled to the movable elongate member and to the midframe, the first biasing member configured to apply a biasing force to the movable elongate member to resist movement of the movable elongate member in a direction of travel of the movable elongate member as the movable elongate member moves;
a rotatable gear coupled to the midframe and disposed between the pair of lens tubes, the rotatable gear being engaged with the movable elongate member; and
a pair of second biasing members coupled to the rod, the pair of second biasing members configured to physically bias the pair of lens tubes toward the rotatable gear.

7. The HMD of claim 6, wherein the actuator comprises a knob that is slidable within a channel defined in the housing of the HMD.

8. The HMD of claim 6, wherein the actuator is located on at least one of a right half of the HMD or a left half of the HMD.

9. The HMD of claim 6, wherein:
the pair of lens tubes are coupled to the rod via a pair of movable frames;
the rotatable gear comprises a pair of spiral projections extending from a face of the rotatable gear; and
the pair of second biasing members are configured to physically bias the pair of lens tubes toward the rotatable gear by physically biasing the pair of movable frames against the pair of spiral projections.

10. The HMD of claim 9, wherein:
each movable frame of the pair of movable frames includes a wing member projecting from a back side of the movable frame, the wing member including an aperture; and
the rod passes through the aperture in the wing member of each movable frame.

11. The HMD of claim 10, wherein the pair of second biasing members are springs that are disposed on the rod, each spring extending between a stop coupled to the rod and the wing member of a corresponding one of the pair of movable frames.

12. The HMD of claim 6, wherein the movable elongate member is coupled to the midframe by an anchor that extends through a channel defined in the movable elongate member.

13. A wearable display comprising:
a rod coupled to a midframe of the wearable display;
a pair of lens assemblies coupled to the rod and movable bidirectionally along the rod;
an actuator accessible from outside of a housing of the wearable display;
a movable elongate member coupled to the actuator and to the midframe;
a first biasing member coupled to the movable elongate member and to the midframe, the first biasing member configured to apply a biasing force to the movable elongate member to resist movement of the movable elongate member in a direction of travel of the movable elongate member as the movable elongate member moves;
a rotatable gear coupled to the midframe and disposed between the pair of lens assemblies, the rotatable gear being engaged with the movable elongate member; and
a pair of second biasing members coupled to the rod, the pair of second biasing members configured to physically bias the pair of lens assemblies toward the rotatable gear.

14. The wearable display of claim 13, wherein the actuator comprises a knob that is movable within a channel defined in the housing of the wearable display.

15. The wearable display of claim 14, wherein movement of the knob to a first end of the channel minimizes a spacing between the pair of lens assemblies, and movement of the knob to a second end of the channel maximizes the spacing.

16. The wearable display of claim 13, wherein the actuator is located on at least one of a right half of the wearable display or a left half of the wearable display.

17. The wearable display of claim 13, wherein:
the pair of lens assemblies are coupled to the rod via a pair of movable frames, each movable frame of the pair of movable frames including a wing member projecting from a back side of the movable frame, the wing member including an aperture; and
the rod passes through the aperture in the wing member of each movable frame.

18. The wearable display of claim 17, wherein the pair of second biasing members are springs that are disposed on the rod, each spring extending between a stop coupled to the rod and the wing member of a corresponding one of the pair of movable frames.

19. The wearable display of claim 13, wherein:
the pair of lens assemblies are coupled to the rod via a pair of movable frames;
the rotatable gear comprises a pair of spiral projections extending from a face of the rotatable gear; and
the pair of second biasing members are configured to physically bias the pair of lens assemblies toward the rotatable gear by physically biasing the pair of movable frames against the pair of spiral projections.

20. The wearable display of claim 13, wherein the first biasing member is a spring that is coupled to a first end of the movable elongate member that is farthest from the actuator, and wherein the spring is coupled to the midframe at a point that is closer to the actuator than the first end of the movable elongate member is to the actuator.

* * * * *